United States Patent
Retsch, Jr.

(10) Patent No.: US 12,104,073 B2
(45) Date of Patent: Oct. 1, 2024

(54) PRODUCT COATED WITH AN AQUEOUS OR POWDER COATING COMPOSITION COMPRISING AN ACRYLIC POLYESTER RESIN

(71) Applicant: PPG Industries Ohio, Inc., Cleveland, OH (US)

(72) Inventor: William H. Retsch, Jr., Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 499 days.

(21) Appl. No.: 17/262,893

(22) PCT Filed: Jul. 25, 2019

(86) PCT No.: PCT/US2019/043504
§ 371 (c)(1),
(2) Date: Jan. 25, 2021

(87) PCT Pub. No.: WO2020/023786
PCT Pub. Date: Jan. 30, 2020

(65) Prior Publication Data
US 2021/0163781 A1    Jun. 3, 2021

Related U.S. Application Data

(60) Provisional application No. 62/703,091, filed on Jul. 25, 2018.

(51) Int. Cl.
| | | |
|---|---|---|
| C09D 151/08 | (2006.01) | |
| C08F 220/06 | (2006.01) | |
| C08F 220/14 | (2006.01) | |
| C08F 220/18 | (2006.01) | |
| C08F 222/06 | (2006.01) | |
| C08F 283/01 | (2006.01) | |
| C08G 63/183 | (2006.01) | |
| C08G 63/199 | (2006.01) | |
| C08G 63/676 | (2006.01) | |
| C08G 63/688 | (2006.01) | |
| C08K 5/3492 | (2006.01) | |
| C09D 5/02 | (2006.01) | |
| C09D 5/03 | (2006.01) | |

(52) U.S. Cl.
CPC .......... *C09D 151/08* (2013.01); *C08F 220/06* (2013.01); *C08F 220/14* (2013.01); *C08F 220/1802* (2020.02); *C08F 222/06* (2013.01); *C08F 283/01* (2013.01); *C08G 63/183* (2013.01); *C08G 63/199* (2013.01); *C08G 63/676* (2013.01); *C08G 63/6886* (2013.01); *C08K 5/34922* (2013.01); *C09D 5/02* (2013.01); *C09D 5/03* (2013.01)

(58) Field of Classification Search
None
See application file for complete search history.

(56) References Cited

U.S. PATENT DOCUMENTS

| | | | |
|---|---|---|---|
| 4,119,680 A | 10/1978 | Vachon | |
| 5,449,707 A * | 9/1995 | Higashiura | C08F 283/01 523/501 |
| 5,932,641 A | 8/1999 | Blanchard et al. | |
| 6,576,717 B1 | 6/2003 | Kuo | |
| 7,745,508 B2 | 6/2010 | Kiefer-Liptak | |
| 7,803,415 B2 | 9/2010 | Kiefer-Liptak | |
| 8,324,316 B2 | 12/2012 | Powell et al. | |
| 9,221,977 B2 | 12/2015 | Ambrose | |
| 2004/0132895 A1* | 7/2004 | Ambrose | C09D 5/08 524/558 |
| 2007/0080065 A1 | 4/2007 | Oravitz et al. | |
| 2010/0260954 A1 | 10/2010 | Stenson et al. | |

FOREIGN PATENT DOCUMENTS

| | | | |
|---|---|---|---|
| CA | 2840950 A1 * | 1/2013 | |
| CN | 105802436 A * | 7/2016 | |
| EP | 1384764 A2 | 1/2004 | |
| EP | 1799741 A1 | 6/2007 | |
| JP | H06329876 A | 11/1994 | |
| JP | 2004026913 A | 1/2004 | |
| JP | 2004223865 A | 8/2004 | |
| JP | 2004224905 A | 8/2004 | |
| WO | 1995005413 A1 | 2/1995 | |
| WO | 2005080517 A1 | 9/2005 | |
| WO | 07/143407 A1 | 12/2007 | |
| WO | 2008036629 A2 | 3/2008 | |
| WO | 2010118356 A1 | 10/2010 | |
| WO | WO 2012/162301 A1 * | 11/2012 | |
| WO | WO 2018111897 A1 * | 6/2018 | |

* cited by examiner

*Primary Examiner* — Tae H Yoon

(57) ABSTRACT

There is disclosed a product coated on at least a portion thereof with a coating. The product may be an automotive product, a household or office appliance, furniture item or tool, a powered industrial product, a consumer electronics article, an architectural product or a product protected by an intumescent coating. The coating may be derived from an aqueous coating composition or a powder coating composition and may comprise an acrylic polyester resin, obtainable by grafting an acrylic polymer with a polyester material, the polyester material being obtainable by polymerizing a polyacid component, with a polyol component including a 2,2,4,4-tetraalkylcyclobutane-1,3-diol. Also disclosed are methods of application, and uses.

25 Claims, No Drawings

PRODUCT COATED WITH AN AQUEOUS OR POWDER COATING COMPOSITION COMPRISING AN ACRYLIC POLYESTER RESIN

CROSS-REFERENCE TO RELATED APPLICATION

The present application is a U.S. National Stage Filing under 35 U.S.C. § 371 of International Application No. PCT/US19/043504, filed on Jul. 25, 2019, which claims benefit under 35 U.S.C. § 119(e) of U.S. Provisional Application Ser. No. 62/703,091, filed Jul. 25, 2018, both of which are incorporated herein by reference.

The present invention relates to a product having a coating on at least a portion thereof, the coating being derived from an aqueous or powder coating composition. The product may be a part of a vehicle, a household appliance, a powered industrial product, an architectural product or an article having an intumescent coating. The invention also extends a method of coating such a product and the use of a defined acrylic polyester resin composition in the coating of such a product.

A wide variety of coatings have been used to coat products of many different types. Coating systems typically have certain properties such as being capable of high speed application, having acceptable adhesion to the substrate, being safe when applied or when later contacted and having properties that are suitable for their end use. Typically, coatings have one, or maybe two, of these advantageous properties depending on their final end use.

Many traditional coating compositions have been supplied in volatile solvent carriers. However there is now a desire to provide more environmentally favorable coating compositions which use no volatile solvent, or a lower amount of volatile solvent that has been used previously. Water is a potential non-volatile solvent which would have very low environmental impact. However polyester materials which have been used in solvent carriers do not usually provide adequate solubility in water. Where it has been possible to use an aqueous composition to coat a polyester material onto a substrate the coating properties, for example the rheology, have not always been acceptable, and the resulting polyester coatings may have poor in-use properties, for example adhesion, longevity, or durability.

It is an object of the present invention to provide products as defined herein, in which problems previously encountered have been overcome, at least in part.

According to the present invention, there is provided a product coated on at least a portion thereof with a coating, the product being an automotive product, a household or office appliance, furniture item or tool, a powered industrial product, a consumer electronics article, an architectural product or a product protected by an intumescent coating, the coating being derived from an aqueous coating composition or a powder coating composition, the coating composition comprising:
(a) an acrylic polyester resin, obtainable by grafting an acrylic polymer with a polyester material, the polyester material being obtainable by polymerizing:
  i) a polyacid component, with
  ii) a polyol component, including 2,2,4,4-tetraalkylcyclobutane-1,3-diol wherein one of the polyacid component or the polyol component comprises a functional monomer operable to impart functionality on to the polyester resin, such that an acrylic polymer may be grafted with the polyester material via the use of said functionality
(b) a crosslinking material.

According to the present invention there is provided a method of coating at least a portion of a product selected from an automotive product, a household or office appliance, furniture item or tool, a powered industrial product, a consumer electronics article, an architectural product or a product protected by an intumescent coating, the method comprising applying a coating composition to at least a portion of the surface of the product, the coating composition comprising an aqueous coating composition or a powder coating composition, the coating composition comprising an acrylic modified polyester resin and a crosslinking material, the acrylic modified polyester resin being obtainable by grafting an acrylic polymer onto a polyester material, the polyester material being obtainable by polymerizing:
  i) a polyacid component, with
  ii) a polyol component, including 2,2,4,4-tetraalkylcyclobutane-1,3-diol
  wherein one of the polyacid component or the polyol component comprises a functional monomer operable to impart functionality on to the polyester resin, such that an acrylic polymer may be grafted onto the polyester material via the use of said functionality, and curing the aqueous or powder composition to form a coating.

According to the present invention there is provided the use of a coating composition comprising an aqueous composition or a powder composition comprising an acrylic modified polyester resin and a crosslinking material, the acrylic modified polyester resin being obtainable by grafting an acrylic polymer onto a polyester material, the polyester material being obtainable by polymerizing:
  i) a polyacid component, with
  ii) a polyol component, including 2,2,4,4-tetraalkylcyclobutane-1,3-diol
  wherein one of the polyacid component or the polyol component comprises a functional monomer operable to impart functionality on to the polyester resin, such that an acrylic polymer may be grafted onto the polyester material via the use of said functionality, to coat at least a portion of the surface of a product selected from an automotive product, a household or office appliance, furniture item or tool, a powered industrial product, a consumer electronics article, an architectural product or a product protected by an intumescent coating.

Advantageously, the inclusion of a polyol component as defined, in the polyester material, has been identified as providing improved hydrolytic stability in an aqueous or powder coating composition thus leading to improved longevity of the polyester and of the aqueous or powder coating composition. Also resistance properties of the coating derived from an aqueous or powder coating composition have been identified as being improved via the inclusion of a defined polyol component in the polyester material. Furthermore, the inclusion of a defined polyol component in the polyester material leads to a better solids viscosity ratio in aqueous dispersion.

The acrylic polyester resin comprises an acrylic modified polyester resin, which may be a polyester material having an acrylic polymer grafted thereonto. The acrylic modified polyester resin may be prepared by grafting an acrylic polymer onto a preformed polyester material. The acrylic modified polyester resin may be prepared by graft polymerizing an acrylic monomer mixture onto a preformed polyester material.

The polyacid component or the polyol component comprises a functional monomer, operable to impart functionality to the polyester resin. The functionality is such that an acrylic polymer may be grafted onto the polyester material via the use of said functionality. The functionality may comprise ethylenic unsaturation, carboxylic acid functionality or epoxy functionality. The functionality may be in the backbone of the polyester material or pendant therefrom.

The functional monomer may comprise an ethylenically unsaturated monomer, which ethylenically unsaturated monomer may be operable to impart ethylenically unsaturated functionality on the backbone of the polyester resin, or pendant therefrom. The functionality may comprise ethylenic unsaturation, which may be in the backbone of the polyester material.

Suitable functional monomers may comprise the following: maleic acid; maleic anhydride; fumaric acid; itaconic anhydride; itaconic acid; citraconic anhydride; citraconic acid; aconitic acid; aconitic anhydride; oxalocitraconic acid; oxalocitraconic anhydride; mesaconic acid; mesaconic anhydride; phenyl maleic acid; phenyl maleic anhydride; t-butyl maleic acid; t-butyl maleic anhydride; monomethyl fumarate; monobutyl fumarate; nadic acid; nadic anhydride; methyl maleic acid; and/or methyl maleic anhydride.

Where the functional monomer is a polyacid, the functional monomer may be present as a proportion of the dry weight of the polyacid component in an amount from 0.5 to 10 wt %, and may be present in an amount from 1 to 5 wt %.

Where the functional monomer is a polyol, the functional monomer may be present as a proportion of the dry weight of the polyol component in an amount from 0.5 to 10 wt %, and may be present in an amount from 1 to 5 wt %.

The polyacid component may comprise a polyacid. "Polyacid" and like terms as used herein, refers to a compound having two or more carboxylic acid groups, such as two (diacids), three (triacids) or four acid groups, and includes an ester of the polyacid (wherein one or more of each acid group may be esterified) or an anhydride. The polyacid may be an organic polyacid.

The carboxylic acid groups of the polyacid may be connected by a bridging group which may be: an alkylene group; an alkenylene group; an alkynylene group; or an arylene group.

The polyester material may be formed from any suitable polyacid. Suitable examples of polyacids include, but are not limited to the following: maleic acid; fumaric acid; itaconic acid; adipic acid; azelaic acid; succinic acid; sebacic acid; glutaric acid; decanoic diacid; dodecanoic diacid; phthalic acid; isophthalic acid; 5-tert-butylisophthalic acid; tetrachlorophthalic acid; tetrahydrophthalic acid; trimellitic acid; naphthalene dicarboxylic acid; naphthalene tetracarboxylic acid; terephthalic acid; hexahydrophthalic acid; methylhexahydrophthalic acid; dimethyl terephthalate; cyclohexane dicarboxylic acid; chlorendic anhydride; 1,3-cyclohexane dicarboxylic acid; 1,4-cyclohexane dicarboxylic acid; tricyclodecane polycarboxylic acid; endomethylene tetrahydrophthalic acid; endoethylene hexahydrophthalic acid; cyclohexanetetra carboxylic acid; cyclobutane tetracarboxylic; esters and anhydrides of all the aforementioned acids and combinations thereof.

The polyacid component may comprise a diacid. Suitable examples of diacids include, but are not limited to the following: phthalic acid; isophthalic acid; terephthalic acid; 1,4 cyclohexane dicarboxylic acid; succinic acid; adipic acid; azelaic acid; sebacic acid; fumaric acid; 2,6-naphthalene dicarboxylic acid; orthophthalic acid; phthalic anhydride; tetrahydrophthalic anhydride; maleic anhydride; succinic anhydride; itaconic anhydride; di-ester materials, such as dimethyl ester derivatives for example dimethyl isophthalate; dimethyl terephthalate; dimethyl 1,4-cyclohexane dicarboxylate; dimethyl 2,6-naphthalene di carboxylate; dimethyl fumarate; dimethyl orthophthalate; dimethylsuccinate; dimethyl glutarate; dimethyl adipate; esters and anhydrides of all the aforementioned acids; and mixtures thereof.

The polyacid component may comprise: terephthalic acid (TPA); isophthalic acid (IPA); dimethyl isophthalic acid; 1,4 cyclohexane dicarboxylic acid; hexahydrophthalic anhydride; 2,6-naphthalene dicarboxylic acid; phthalic anhydride; maleic anhydride; and/or fumaric anhydride.

The polyacid component may comprise: dimethyl terephthalate; hexahydrophthalic anhydride; and/or cyclohexane 1,4-dicarboxylic acid.

The polyol component comprises a polyol. "Polyol" and like terms, as used herein, refers to a compound having two or more hydroxyl groups, such as two (diols), three (triols) or four hydroxyl groups. The hydroxyl groups of the polyol may be connected by a bridging group which may be: an alkylene group; an alkenylene group; an alkynylene group; or an arylene group. The polyol may be an organic polyol.

The polyester material may be formed from any suitable polyol, in addition to, a defined polyol component of the present invention. Suitable examples of polyols include, but are not limited to the following: alkylene glycols, such as ethylene glycol; propylene glycol; diethylene glycol; dipropylene glycol; triethylene glycol; tripropylene glycol; hexylene glycol; polyethylene glycol; polypropylene glycol and neopentyl glycol; hydrogenated bisphenol A; cyclohexanediol; propanediols including 1,2-propanediol; 1,3-propanediol; butyl ethyl propanediol; 2-methyl-1,3-propanediol; and 2-ethyl-2-butyl-1,3-propanediol; butanediols including 1,4-butanediol; 1,3-butanediol; and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-capro lactone and ethylene glycol); hydroxyalkylated bisphenols; polyether glycols, for example, poly(oxytetramethylene) glycol; trimethylol propane; pentaerythritol; di-pentaerythritol; trimethylol ethane; trimethylol butane; dimethylol cyclohexane; glycerol and the like or combinations thereof.

The polyol component may comprise a diol. The polyol component may comprise any suitable diol. Suitable examples of diols include, but are not limited to the following: ethylene glycol; 1,2-propane diol; 1,3-propane diol; 1,2-butandiol; 1,3-butandiol; 1,4-butandiol; but-2-ene 1,4-diol; 2,3-butane diol; 2-methyl 1,3-propane diol; 2,2'-dimethyl 1,3-propanediol (neopentyl glycol); 1,5 pentane diol; 3-methyl 1,5-pentanediol; 2,4-diethyl 1,5-pentane diol; 1,6-hexane diol; 2-ethyl 1,3-hexane diol; diethylene glycol; triethylene glycol; dipropylene glycol; tripropylene glycol; 2,2,4-trimethyl pentane 1,3-diol; 1,4 cyclohexane dimethanol; tricyclodecane dimethanol; isosorbide; 1,4-cyclohexane diol; 1,1'-isopropylidene-bis (4-cyclohexanol); and mixtures thereof.

In particular the polyol component may comprise: 2-methyl propanediol (2-MPD); neopentyl glycol (NPG); 1,4-cyclohexane dimethanol (CHDM); butyl ethyl propane diol (BEPD); trimethylolppropane (TMP) and/or 1,6 hexanediol.

A defined polyol compound used in the present invention may be present as a proportion of the dry weight of the polyol component in an amount from 10 to 80 wt %, and may be present in an amount from 10 to 70 wt %.

The polyol component may comprises a polyol compound defined in the present invention in combination with 2-methyl-1,3 propanediol and/or cyclohexanedimethanol. The polyol component may comprises a defined polyol compound defined in the present invention in combination with 2-methyl-1,3 propanediol and/or cyclohexanedimethanol.

2,2,4,4-tetraalkylcyclobutane-1,3-diol (TACD) is a polyol compound which may be used in the present invention, and can be represented by the general structure:

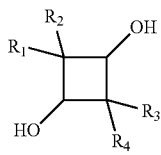

wherein R1, R2, R3, and R4 each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals. Examples of TACD include 2,2,4,4-tetramethylcyclobutane-1,3-diol (TMCD); 2,2,4,4-tetraethylcyclobutane-1,3-diol (TECD); 2,2,4,4-tetra-n-propylcyclobutane-1,3-diol; 2,2,4,4-tetra-n-butylcyclobutane-1,3-diol; 2,2,4,4-tetra-n-pentylcyclobutane-1,3-diol; 2,2,4,4-tetra-n-hexylcyclobutane-1,3-diol; 2,2,4,4-tetra-n-heptylcyclobutane-1,3-diol; 2,2,4,4-tetra-n-octylcyclobutane-1,3-diol; 2,2-dimethyl-4,4-diethylcyclobutane-1,3-diol; 2-ethyl-2,4,4-trimethylcyclobutane-1,3-diol; 2,4-dimethyl-2,4-diethyl-cyclobutane-1,3-diol; 2,4-dimethyl-2,4-di-n-propylcyclobutane-1,3-diol; 2,4-n-dibutyl-2,4-diethylcyclobutane-1,3-diol; 2,4-dimethyl-2,4-diisobutylcyclobutane-1,3-diol; and 2,4-diethyl-2,4-diisoamylcyclobutane-1,3-diol. Suitably, the TACD comprises 2,2,4,4-tetramethylcyclobutane-1,3-diol ("TMCD").

Suitably, the polyacid component and/or the polyol component comprises a sulfonated monomer. The sulfonated monomer may comprise a sulfonated diacid, such as a sulfonated aromatic diacid. The sulfonated monomer may comprise a salt thereof, such as an inorganic salt, for example a metal or ammonium salt. Examples of metal salts would include, for example sodium salts, lithium salts, potassium salts, magnesium salts, calcium salts, iron salts etc.

The polyacid component may comprise a sulfonated monomer.

The sulfonated monomer may comprise a metal salt of 5-(sulfo)-isopthalic acid, such as the sodium salt thereof, referred to as 5-(sodiosulfo)-isophthalic acid, also referred to herein as 5-SSIPA.

The sulfonated monomer may comprise: 5-(sodiosulfo)-isopthalic acid, dimethyl 5-(sodiosulfo)isophalate, 5-(lithiosulfo)isopthalic acid, and/or bis(2-hydroxyethyl)-5-(sodiosulfo)isophthalate.

Where the sulfonated monomer comprises a polyacid, the sulfonated monomer may be present as a proportion of the dry weight of the polyacid component in an amount from 5 to 20 wt %, such as from 7 to 15 wt %.

Where the sulfonated monomer comprises a polyol, the sulfonated monomer may be present as a proportion of the dry weight of the polyol component in an amount from 5 to 20 wt %, such as from 7 to 15 wt %.

The polyacid component may comprise: dimethyl terephthalate; isophthalic acid; hexahydrophthalic anhydride; cyclohexane 1,4-dicarboxylic acid; and/or 5-(sodiosulfo)-isophthalic acid.

The functional monomer may comprise maleic acid, maleic anhydride and/or fumaric acid.

The polyester material may be modified with an acrylic compound by grafting an acrylic modification polymer onto the polyester material. This grafting may occur via free radical polymerization, such as by free radical polymerization onto ethylenic unsaturation on the polyester material.

The acrylic modification polymer may be formed from acrylic monomers. The acrylic modification polymer may be grafted onto the polyester by polymerizing acrylic monomers in the presence of the polyester material to form the acrylic modified polyester resin.

Various acrylic monomers can be combined to prepare the acrylic modification polymer. Examples include methyl (meth)acrylate; ethyl(meth)acrylate; butyl (meth)acrylate; isobornyl (meth)acrylate; hydroxyethyl (meth)acrylate; 2-ethylhexyl(meth)acrylate; (meth)acrylic acid; nitriles such as (meth)acrylonitrile. Any other acrylic monomers known to those skilled in the art could also be used. The term "(meth) acrylate" and like terms are used conventionally and herein to refer to both methacrylate and acrylate. A suitable acrylic modification polymer is formed from: methyl (meth)acrylate; ethyl(meth)acrylate; butyl (meth)acrylate; hydroxyethyl (meth)acrylate; (meth)acrylic acid; cyclohexyl (meth)acrylate; allyl (meth)acrylate; dimethylamino ethyl methacrylate. butylamino ethyl (meth)acrylate; and/or HEMA phosphate (such as ethylene glycol methacrylate phosphate).

The acrylic modification polymer may also comprise an amount (from 0 to 30 w %, by dry weight of the acrylic modification polymer) of non acrylic monomers. Such non acrylic monomers may include other ethylenically unsaturated monomers, such as styrene, ethylene, propylene, vinyl toluene, butadiene, 1-octene or isoprene, vinyl esters such as vinyl acetate.

It has been identified that the acrylic modification polymer may include meth acrylic acid or acrylic acid to impart acid functionality on the acrylic modification polymer. The acid functionality on the acrylic modification polymer may be at least partially neutralised with a neutralization agent.

Useful neutralization agents include ammonia or amine functional moieties: methyl ethanolamine, dimethylethanolamine (DMEA), trimethylamine, diethylene triamine.

The acid functionality on the acrylic modification polymer may be at least 50% neutralised with a neutralization agent. The acid functionality on the acrylic modification polymer may be at least 75% neutralised with a neutralization agent. The acid functionality on the acrylic modification polymer may be at least 90% neutralised with a neutralization agent.

Where the polyester material of the acrylic modified polyester resin comprises a sulfonated monomer, neutralization of the acrylic modified polyester resin may not be required.

The polyester material may have any suitable number-average molecular weight (Mn). The polyester material may have a Mn from 1,000 Daltons (Da=g/mole) to 15,000 Da, for example from 2,000 Da to 10,000 Da, such as from 3,000 Da to 8,000 Da, or even from 4,000 to 7,000 Da.

The number-average molecular weight may be measured by any suitable method. Techniques to measure the number-average molecular weight will be well known to a person skilled in the art. As reported herein, the Mn may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector; 254 nm, solvent: unstabilised THF, retention time marker: toluene, sample concentration: 2 mg/ml).

The polyester material may have any suitable glass transition temperature (Tg). The polyester material may have a Tg from 0° C. to 100° C.

The polyester material may have any suitable gross hydroxyl value (OHV). The polyester material may have a gross OHV from 0 to 120 mg KOH/g. Suitably, the polyester material may have a gross OHV from 5 to 100 mg KOH/g, such as from 10 to 60 mg KOH/g, or even from 20 to 40 mg KOH/g.

The gross OHV, is suitably expressed on solids.

The polyester material may have any suitable acid value (AV). The polyester material may have an AV from 0 to 20 KOH/g. The polyester may have a gross AV from 0 to 10 mg KOH/g, for example less than 5 or even less than 3.

The AV is suitably expressed on solids.

The acrylic polyester resin, which may be an acrylic modified polyester resin may be present in the coating composition in an amount from 50 to 99 wt % (based on dry weight of the coating composition). Suitably, the acrylic polyester resin, which may be an acrylic modified polyester resin, may be present in the aqueous or powder coating composition in an amount from 60 to 95 wt % (based on dry weight of an aqueous or powder coating composition).

The acrylic polyester resin, which may be an acrylic modified polyester resin, may have any suitable number-average molecular weight (Mn). The acrylic polyester resin, which may be an acrylic modified polyester resin, may have an Mn from 1,000 Daltons (Da=g/mole) to 15,000 Da, for example from 2,000 Da to 10,000 Da, such as from 3,000 Da to 8,000 Da, or even from 4,000 to 7,000 Da.

The number-average molecular weight may be measured by any suitable method. Techniques to measure the number-average molecular weight will be well known to a person skilled in the art. Suitably, and as reported herein, the Mn may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector; 254 nm, solvent: unstabilised THF, retention time marker: toluene, sample concentration: 2 mg/ml).

The Tg of the acrylic modification polymer (which is a measure of the Tg of the acrylic modification polymer, polymerized as a simple acrylic polymer, not in the presence of (or grafted onto) a polyester material) is 20 to 120 C.

The acrylic polyester resin when cured may have any suitable glass transition temperature (Tg). The acrylic polyester resin and/or a coating may have a Tg from 25 C to 200 C.

The cured coating formed from the coating composition may have any suitable glass transition temperature (Tg). The cured coating may have any suitable glass transition temperature (Tg). The coating may have a Tg from 25 C to 200 C.

The polyester material, the cured acrylic polyester resin and/or the cured coating derived from the coating composition may have a Tg of at least 25 C, or at least 30 C, or at least 35 C, such as at least 40° C. or at least 45 C, or at least 50 C. such as at least 55 C or at least 60 C, or at least 65 C, or at least 70 C, or at least 75 C, or at least 80 C.

The polyester material, the acrylic polyester resin and/or a coating formed from the coating composition may have a Tg of up to 200 C. such as up to 150 C, or up to 120 C, or up to 110 C, or up to 105 C.

The glass transition temperature of the polyester material, the acrylic polyester resin and/or a coating may be measured by any suitable method. Methods to measure Tg will be well known to a person skilled in the art. As reported herein, the Tg may be measured according to ASTM D6604-00(2013) ("Standard Practice for Glass Transition Temperatures of Hydrocarbon Resins by Differential Scanning calorimetry". Heat-flux differential scanning calorimetry (DSC), sample pans: aluminium, reference: blank, calibration: indium and mercury, sample weight: 10 mg, heating rate: 20 C/min).

The acrylic polyester resin, which may be an acrylic modified polyester resin, may have any suitable gross hydroxyl value (OHV). The acrylic modified polyester resin may have a gross OHV from 0 to 120 mg KOH/g. The acrylic modified polyester resin may have a gross OHV from 5 to 100 mg KOH/g, such as from 10 to 60 mg KOH/g, or even from 20 to 50 mg KOH/g.

The gross OHV, is suitably expressed on solids.

The acrylic polyester resin, which may be an acrylic modified polyester resin, may have any suitable acid value (AV). The acrylic modified polyester resin may have an AV from 10 to 80 KOH/g. The acrylic modified polyester resin may have a gross AV from 20 to 70 mg KOH/g, such as from 30 to 60 mg KOH/g.

The AV is suitably expressed on solids.

Suitably, the acrylic polyester resin, which may be an acrylic modified polyester resin, is formed from the polyester material and the acrylic modification polymer in a weight ratio from 85 wt % to 55 wt % polyester material to from 45 wt % to 15 wt % acrylic modification polymer, such as a weight ratio from 80 wt % to 60 wt % polyester material to from 40 wt % to 20 wt % acrylic modification polymer, such as a weight ratio from 75 wt % to 65 wt % polyester material to from 35 wt % to 25 wt % acrylic modification polymer. For example, the acrylic modified polyester resin may be formed from the polyester material and the acrylic modification polymer in a weight ratio of 70 wt % polyester material to 30 wt % acrylic modification polymer The acrylic polyester resin, which may be an acrylic modified polyester resin, may be present in an aqueous or powder coating composition in an amount from 50 to 99 wt % (based on dry weight of the aqueous or powder coating composition). Suitably, the acrylic polyester resin may be present in an aqueous or powder coating composition in an amount from 60 to 95 wt % (based on dry weight of the aqueous or powder coating composition).

The polyester material according to the present invention may be prepared in the presence of an esterification catalyst. Suitably, the esterification catalyst may be chosen to promote the reaction of components by esterification and/or trans-esterification. Suitable examples of esterification catalysts for use in the preparation of the polyester material include, but are not limited to the following: metal compounds such as stannous octoate; stannous chloride; butyl stannoic acid (hydroxy butyl tin oxide); monobutyl tin tris (2-ethylhexanoate); chloro butyl tin dihydroxide; tetra-n-propyl titanate; tetra-n-butyl titanate; zinc acetate; acid compounds such as phosphoric acid; para-toluene sulphonic acid; dodecyl benzene sulphonic acid (DDBSA), tetra alkyl zirconium materials, antimony trioxide, germanium dioxide, bismuth octoate and combinations thereof. The esterification catalyst may be dodecyl benzene sulphonic acid (DDBSA).

The esterification catalyst, when present, may be used in amounts from 0.001 to 1% by weight on total polymer components, suitably from 0.01 to 0.2%, such as from 0.025 to 0.2% by weight on total polymer components.

The term "alk" or "alkyl", as used herein unless otherwise defined, relates to saturated hydrocarbon radicals being straight, branched, cyclic or polycyclic moieties or combinations thereof and contain 1 to 20 carbon atoms, for example 1 to 10 carbon atoms, such as 1 to 8 carbon atoms, or 1 to 6 carbon atoms, or even 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or heteroatom, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like. The term "alkylene", as used herein, relates to a bivalent radical alkyl group as defined above. For example, an alkyl group such as methyl which would be represented as —$CH_3$, becomes methylene, —$CH_2$—, when represented as an alkylene. Other alkylene groups should be understood accordingly.

The term "alkenyl", as used herein, relates to hydrocarbon radicals having a double bond, suitably up to 4, double bonds, being straight, branched, cyclic or polycyclic moieties or combinations thereof and containing from 2 to 18 carbon atoms, suitably 2 to 10 carbon atoms, more suitably from 2 to 8 carbon atoms, still more suitably 2 to 6 carbon atoms, yet more suitably 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH=CH2, becomes ethenylene, —CH=CH—, when represented as an alkenylene. Other alkenylene groups should be understood accordingly.

The term "alkynyl", as used herein, relates to hydrocarbon radicals having a triple bond, suitably up to 4, triple bonds, being straight, branched, cyclic or polycyclic moieties or combinations thereof and having from 2 to 18 carbon atoms, suitably 2 to 10 carbon atoms, more suitably from 2 to 8 carbon atoms, still more suitably from 2 to 6 carbon atoms, yet more suitably 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsiloxane groups. Examples of such radicals may be independently be alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as —C≡CH, becomes ethynylene, —C≡C—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsilcon groups. Examples of such radicals may be independently be phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as -Ph, becomes phenylene, -Ph-, when represented as an arylene. Other arylene groups should be understood accordingly.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

Aqueous and powder coating compositions of the present invention comprise a crosslinking material. The crosslinking material may be operable to crosslink the acrylic modified polyester resin. The crosslinking material may be a single molecule, a dimer, an oligomer, a (co)polymer or a mixture thereof. The crosslinking material may be a dimer or trimer.

The crosslinking material may be operable to crosslink the acrylic polyester resin.

The crosslinking material may comprise any suitable crosslinking material. Suitable crosslinking materials will be well known to the person skilled in the art. Suitable crosslinking materials include, but are not limited to the following: benzoguanamine, phenolic resins (or phenol-formaldehyde resins); aminoplast resins (or triazine-formaldehyde resins); amino resins; epoxy resins; isocyanate resins; beta-hydroxy (alkyl) amide resins; alkylated carbamate resins; polyacids; anhydrides; organometallic acid-functional materials; polyamines; polyamides and combinations thereof.

Non-limiting examples of phenolic resins are those formed from the reaction of a phenol with an aldehyde or a ketone, suitably from the reaction of a phenol with an aldehyde, such as from the reaction of a phenol with formaldehyde or acetaldehyde, or even from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. Suitably, the phenolic resins are of the resol type. By "resol type" we mean resins formed in the presence of a basic (alkaline) catalyst and optionally an excess of formaldehyde. Suitable examples of commercially available phenolic resins include, but are not limited to those sold under the trade name PHENODUR® commercially available from Cytec Industries, such as PHENODUR EK-827, PHENODUR VPR1785, PHENODUR PR 515, PHENODUR PR516, PHENODUR PR 517, PHENODUR PR 285, PHENODUR PR612 or PHENODUR PH2024; resins sold under the trade name BAKELITE® commercially available from Momentive, such as BAKELITE 6582 LB, BAKELITE 6535, BAKELITE PF9989 or BAKELITE PF6581; SFC 112 commercially available from Schenectady; DUREZ® 33356 commercially available from SHHPP; ARALINK® 40-852 commercially available from Bitrez; or combinations thereof.

An aqueous or powder coating composition may be substantially formaldehyde free, or suitably essentially formaldehyde free, or suitably completely formaldehyde free. By "substantially free" we mean to refer to aqueous or powder coating compositions containing less than 1000 parts per million (ppm) of any of the compounds or derivatives thereof mentioned above. By "essentially free" we mean to refer to aqueous or powder coating compositions containing less than 100 ppm of any of the compounds or derivatives thereof mentioned above. By "completely free" we mean to refer to aqueous or powder coating compositions containing less than 20 parts per billion (ppb) of any of the compounds or derivatives thereof.

Non limiting examples of isocyanate resins include, but are not limited to the following: isophorone diisocyanate (IPDI), such as those sold under the trade name DESMODUR® commercially available from Bayer, for example DESMODUR VP-LS 2078/2 or DESMODUR PL 340 or those sold under the trade name VESTANAT® commercially available from Evonik, for example VESTANANT B 1370, VESTANAT B 118 6A or VESTANAT B 1358 A; blocked aliphatic polyisocyanate based on hexamethylene diisocyanate (HDI), such as those sold under the trade name DESMODUR® commercially available from Bayer, for example DESMODUR BL3370 or DESMODUR BL 3175 SN, those sold under the trade name DURANATE® commercially available from Asahi KASEI, for example DURANATE MF-K60X, those sold under the trade name TOLONATE® commercially available from Perstorp, for example TOLONATE D2 or those sold under the trade name TRIXENE® commercially available from Baxenden, for example TRIXENE-BI-7984 or TRIXENE 7981; or combinations thereof.

The crosslinking material may contain nitrogen. The crosslinking material may be in the form of an amine or amide material. The crosslinking material may comprise a hydroxyl substituted amine or amide material.

Suitably, the crosslinking material may comprise a hydroxyalkylamide material, such as a β-hydroxyalkylamide material.

The crosslinking material may contain a terminal chemical group as shown in Formula I.

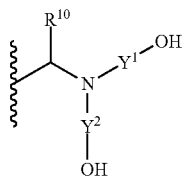

Formula I wherein $R^{10}$ represents an electron withdrawing group, such as (=O); and $Y^1$ and $Y^2$ each, independently, represents a $C_1$ to $C_3$ alkylene group.

The terminal chemical group of Formula I may be connected to a further chemical structure, not shown. Additionally or alternatively, the chemical group of formula I may be suspended from a carrier substrate, such as a silica carrier substrate, for example.

The crosslinking material may contain a plurality of terminal chemical groups as shown in Formula I. For example, the crosslinking material may contain 2, 3 or 4 terminal chemical groups as shown in Formula I.

The crosslinking material may comprise a moiety according to Formula II:

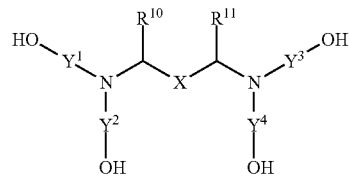

Formula II wherein $R^{10}$ and $R^{11}$ each, independently, represent an electron withdrawing group, such as (=O); $Y^1$, $Y^2$, $Y^3$ and $Y^4$ each, independently, represent a $C_1$ to $C_3$ alkylene group; and X represents a $C_2$ to $C_6$ alkylene group.

Suitably, each of $R^{10}$ and $R^{11}$ represents a (=O) group.
Suitably, each of $Y^1$, $Y^2$, $Y^3$ and $Y^4$ represent an ethylene group.
Suitably, X represents a butylene group.
Accordingly, the crosslinking material may comprise a material of formula III:

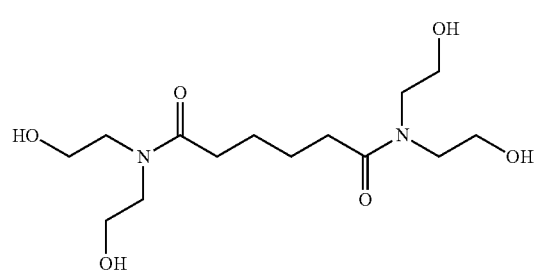

Formula II

The crosslinking material may comprise a commercially available β-hydroxyalkylamide crosslinking, such as, for example, PRIMID XL-552 (available from Rohm and Haas); PRIMID QM-1260 (available from EMS Chemie); and N,N,N',N'-tetrakis(2-hydroxypropyl)adipamide.

The crosslinking material may be in the form of a urea material. The crosslinking material may comprise a hydroxyl substituted urea material.

Suitably, the crosslinking material may comprise a hydroxy functional alkyl polyurea material.

The crosslinking material may contain a terminal chemical group as shown in Formula IV.

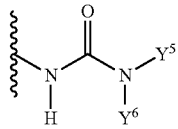

Formula IV wherein $Y^5$ and $Y^6$ each, independently, represent hydrogen, an alkyl or a hydroxy functional alkyl having two or more carbon atoms and at least one of $Y^5$ and $Y^6$ is a hydroxyl functional alkyl having two or more carbon atoms.

The $Y^5$ and $Y^6$ groups may exclude ether linkages.

The terminal chemical group of Formula IV may be connected to a further chemical structure, not shown. Additionally or alternatively, the chemical group of Formula IV may be suspended from a carrier substrate, such as a silica carrier substrate, for example.

The crosslinking material may contain a plurality of terminal chemical groups as shown in Formula IV. For example, the crosslinking material may contain 2 to 6 terminal chemical groups as shown in Formula IV, such as 2, 3 or 4 terminal chemical groups as shown in Formula IV.

The crosslinking material may comprise a moiety according to Formula V:

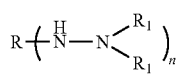

Formula V wherein R comprises the residue of an isocyanurate, biuret, allophonate, glycoluril, benzoguanamine, and/or polyetheramine; each $R_1$ is independently a hydrogen, an alkyl or a hydroxy functional alkyl having 2 or more carbons and at least one $R_1$ is a hydroxy functional alkyl having 2 or more carbons; and n is 2-6.

Suitably, the $R_1$ group may exclude ether linkages.

The crosslinking material may comprise a moiety according to Formula VI:

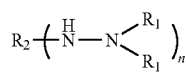

Formula VI wherein $R_2$ comprises a substituted or unsubstituted $C_1$ to $C_{36}$ alkyl group, an aromatic group, or the residue of an isocyanurate, biuret, allophonate, glycoluril, benzoguanamine, and/or polyetheramine; each $R_1$ is independently a hydrogen, an alkyl group having 1 or more carbons, or a hydroxy functional alkyl having 2 or more carbons and at least one $R_1$ is a hydroxy functional alkyl having 2 or more carbons; and n is 2-6.

Suitably, the $R_1$ group may exclude ether linkages.

R and $R_2$ may comprise the residue of an isocyanurate, biuret, allophonate, glycoluril, benzoguanamine and/or polyetheramine. An isocyanurate will be understood as referring to a compound having three isocyanate groups, typically in ring form, and is sometimes referred to as a trimer. This can include compounds having isocyanurate moieties. Isocyanurates can be purchased from Covestro and Vencore X Chemical. Suitable commercially available isocyanurates include those sold under the trade name DESMODUR such as, for example, DESMODUR N 3300A, DESMODUR N3800, DESMODUR N3400, DESMODUR N3600, DESMODUR N3900 and DESMODUR RC (commercially available from Covestro), those sold under the trade name VESTANANT such as, for example, VESTANAT T1890/100 (commercially available from Evonik) and those sold under the trade name EASAQUA such as, for example, EASAQUA WT 2102, EASAQUA X D 401, EASAQUA M 501, EASAQUA X D 803, EASAQUA M 502 and EASAQUA X L 600 (commercially available from Vencore X Chemical). A particularly suitable hydroxy functional alkyl polyurea formed from an isocyanurate is shown in Formula VII:

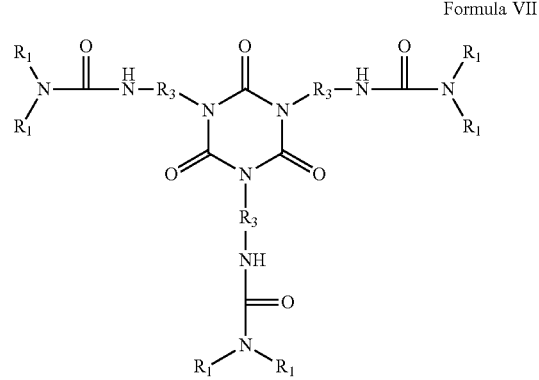

Formula VII wherein $R_1$ is as described above; and each $R_3$ independently comprises an alkyl, aryl, alkylaryl, arylalkyl, alicyclic, and/or polyetheralkyl group.

A particularly suitable hydroxy functional alkyl polyurea formed from a bis-isocyanurate is shown below in Formula VIII:

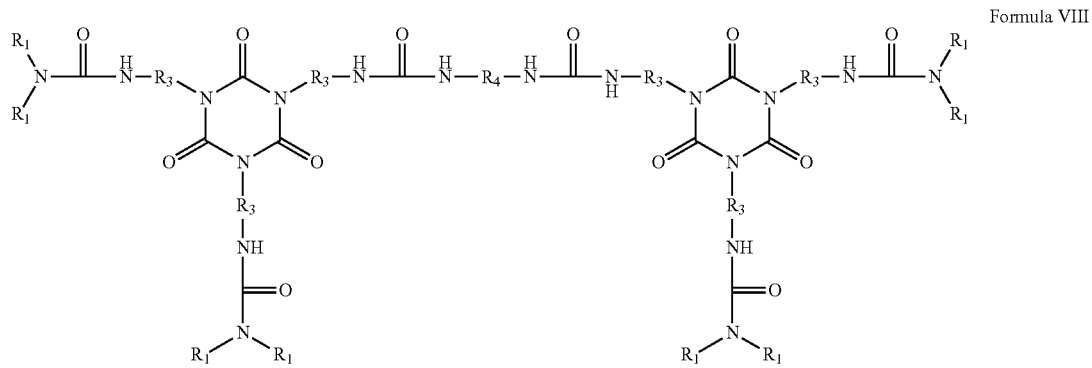

Formula VIII wherein $R_1$ and $R_3$ are as described above.

A biuret will be understood as referring to a compound that results upon the condensation of two molecules of urea, and is sometimes referred to as a carbamylurea. Biurets are commercial available from Vencore X Chemical and Covestro as, for example, DESMODUR N-75, DESMODUR N-100, and DESMODUR N-3200, HDB 75B, HDB 75M, HDB 75MX, HDB-LV. A particularly suitable hydroxy functional alkyl polyurea formed from a biuret is shown below in Formula IX:

Formula IX

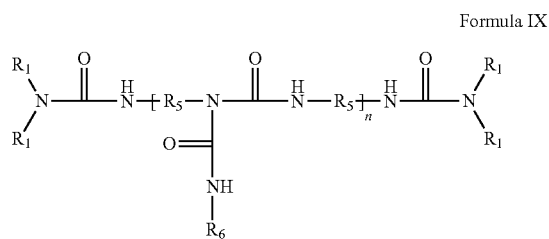

wherein $R_1$ is as described above; each $R_5$ independently comprises an alkyl, aryl, alkylaryl, arylalkyl, alicyclic, and/or polyetheralkyl group; and $R_6$ comprises H or an alkyl group.

Uretidione is a dimer of diisocyanate, examples of which include DESMODUR N-3400 polyisocyanate, a blend of the trimer and uretidione of HDI:

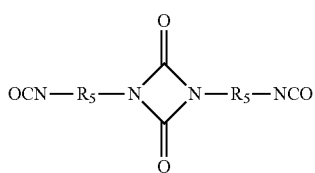

wherein each $R_5$ independently comprises an alkyl, aryl, alkylaryl, arylalkyl, alicyclic, and/or polyetheralkyl group.

An allophonate will be understood as referring to a compound made from urethane and isocyanate. A method for making an allophonate is described at Surface Coating, Vol 1, Raw material and their usage, Landon New York, Chapman and Hall, Page 106. The reaction is generally depicted below in scheme I:

Scheme I

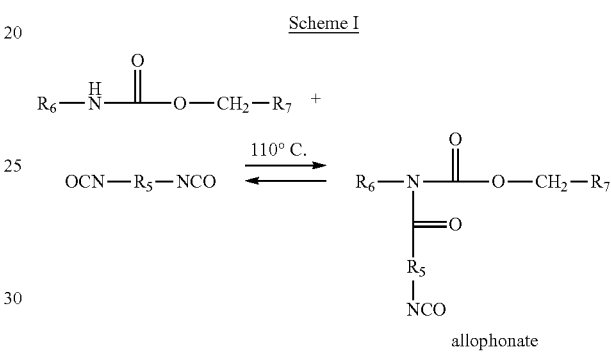

allophonate wherein $R_5$ and $R_6$ are each as described above; and $R_7$ independently comprises residues of a primary alcohol which is reacted with isocyanate.

A glycoluril will be understood as referring to a compound composed of two cyclic urea groups joined across the same two-carbon chain, a suitable examples of which includes the below:

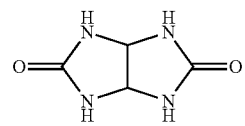

Glycoluril is widely commercially available, such as from Sigma-Aldrich.

Benzoguanamine is also known as 6-phenyl-1,3,5-triazine-2,4-diamine and is commercially available from The Chemical Company, Jamestown, RI.

A polyether amine will be understood as referring to a compound having amine groups attached to a polyether backbone such as one characterized by propylene oxide, ethylene oxide, or mixed propylene oxide and ethylene oxide repeating units in their respective structures, such as, for example, one of the Jeffamine series products. Examples of such polyetheramines include aminated propoxylated pentaerythritols, such as JEFFAMINE XTJ-616, and those represented by Formulas (X) through (VI).

According to Formula (IV) the polyether amine may comprise:

Formula X

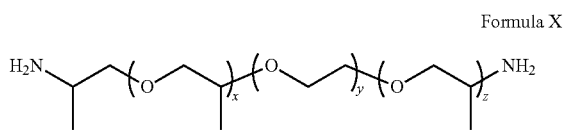

wherein y=0-39, x+z=1-68.

Suitable amine-containing compounds represented by Formula X include, but are not limited to, amine-terminated polyethylene glycol such as those commercially available from Huntsman Corporation in its JEFFAMINE ED series, such as JEFFAMINE HK-511, JEFFAMINE ED-600, JEFFAMINE ED-900 and JEFFAMINE ED-2003, and amine-terminated polypropylene glycol such as in its JEFFAMINE D series, such as JEFFAMINE D-230, JEFFAMINE D-400, JEFFAMINE D-2000 and JEFFAMINE D-4000.

According to Formula XI the polyetheramine may comprise:

Formula XI

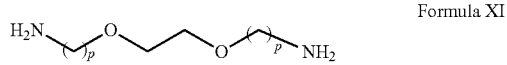

wherein each p independently is 2 or 3.

Suitable amine-containing compounds represented by Formula XI include, but are not limited to, amine-terminated polyethylene glycol based diamines, such as Huntsman Corporation's JEFFAMINE EDR series, such as JEFFAMINE EDR-148 and JEFFAMINE EDR-176.

According to Formula XII the polyetheramine may comprise:

Formula XII

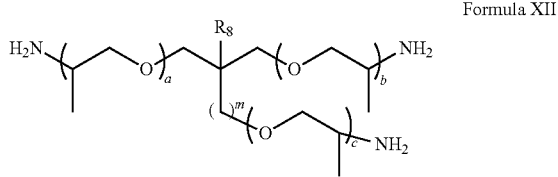

wherein $R_8$ is H or $C_2H_5$, m=0 or 1, a+b+c=5-85.

Suitable amine-containing compounds represented by Formula (VI) include, but are not limited to, amine-terminated propoxylated trimethylolpropane or glycerol, such as Huntsman Corporation's Jeffamine T series, such as JEFFAMINE T-403, JEFFAMINE T-3000 and JEFFAMINE T-5000.

Particularly suitable are di- and tri-amines, such as 4,7,10-trioxa-1,13-tridecanediamine, JEFFAMINE D400, JEFFAMINE D4000, JEFFAMINE D2000, JEFFAMINE T403.

In all cases, $R_2$ may be substituted or unsubstituted. $R_2$, as noted above, may also comprise a substituted or unsubstituted $C_1$ to $C_{36}$ alkyl group and/or an aromatic group. For example, the alkyl group may have two to ten carbon atoms such as six carbon atoms. The alkyl group may derive from an isocyanate, such as a diisocyanate. Suitable examples include isophorone diisocyanate and hexamethylene isocyanate. The aromatic group may derive from an aromatic ring containing isocyanate, suitable examples of which include methylene diphenyl diisocyanate, toluene diisocyanate and tetramethylxylylene diisocyanate.

Certain hydroxy functional alkyl polyureas of, and/or used according to, the invention may be made by reacting an isocyanate-containing compound with amino alcohol. Any isocyanate-containing compound having at least two isocyanate groups can be used, such as any of those described above. It will be appreciated that the "R" or "$R_2$" group will reflect the isocyanate-containing compound employed.

Similarly, any amino alcohol having two or more carbon atoms can be used, and the "$R_1$" group will reflect the amino alcohol employed. The amino alcohol can have one, two or more hydroxyl functional groups. Amino alcohols can be used, which will result in different $R_1$ groups being present on the polyurea. $R_1$ can also be hydrogen or an alkyl group. Suitable amino alcohols include monoethanol amine, diethanol amine and diispropyl amine.

The hydroxyl functional alkyl polyureas can be made by reacting amino alcohol with an isocyanate-containing compound in an organic polar solvent, such as alcohol or water. The reaction temperate may be kept below 35° C. The equivalent ratio of amine to isocyanate may be 2-1:1-2, such as 1:1.

The hydroxy functional alkyl polyureas of, and/or used according to, the invention may be made by alternative methods as well. For example, amino alcohols can react with carbonate to form hydroxylalkyl carbamate, and hydroxylalkyl carbamate can further react with amines to form hydroxy functional alkyl polyureas.

The number-average molecular weight (Mn) of the hydroxy functional alkyl polyurea may be 100 or greater, such as 350 or greater or 1,000 or greater, and/or can be 6,000 or lower, such as 3,000 or lower, or 2,000 or lower. Mn means the theoretical value as determined by Gel Permeation Chromatography using Waters 2695 separation module with a Waters 410 differential refractometer (RI detector) and polystyrene standards. The range of molecular weights of the polystyrene standards for this method is from approximately 800 to 900,000 g/mol. In determining Mn according to the invention, tetrahydrofuran (THF) was used as the eluent at a flow rate of 1 ml min-1, and two PL Gel Mixed C columns were used for separation.

The hydroxyl functional alkyl polyurea material may be made by reacting a dialkanol amine with hexamethylene diisocyanate (HDI) trimer and/or isophorone diisocyanate (IDPI) trimer, suitably hexamethylene diisocyanate (HDI) trimer. The hydroxyl functional alkyl polyurea material may be made by reacting diethanolamine with hexamethylene diisocyanate (HDI) trimer and/or isophorone diisocyanate (IDPI) trimer, suitably hexamethylene diisocyanate (HDI) trimer. The hydroxyl functional alkyl polyurea material may be made by reacting diisopropanolamine with hexamethylene diisocyanate (HDI) timer and/or isophorone diisocyanate (IDPI) trimer, suitably hexamethylene diisocyanate (HDI) trimer.

The crosslinking material may be present in the aqueous or powder coating compositions of the present invention is any suitable amount. The aqueous or powder coating compositions may comprise from 0.5 to 40 wt %, suitably from 1 to 30 wt %, such as from 5 to 20 wt % of the crosslinking material based on the total solid weight of the aqueous or powder coating composition.

The crosslinking material may comprise a phenolic resin, benzoguanamine and/or melamine.

The aqueous or powder coating composition may comprise a catalyst. Suitable examples of catalysts include, but are not limited to the following: metal compounds such as stannous octoate; stannous chloride; butyl stannoic acid (hydroxy butyl tin oxide); monobutyl tin tris (2-ethylhexanoate); chloro butyl tin dihydroxide; tetra-n-propyl titanate; tetra-n-butyl titanate; zinc acetate; acid compounds such as phosphoric acid; para-toluene sulphonic acid; dodecyl benzene sulphonic acid (DDBSA) such as blocked DDBSA, tetra alkyl zirconium materials, antimony trioxide, germanium dioxide and combinations thereof. The catalyst may comprise dodecyl benzene sulphonic acid (DDBSA), such as blocked DDBSA.

The catalyst may be present in the aqueous or powder coating composition in amounts from 0.001 to 1% by dry weight of the aqueous or powder coating composition, suitably from 0.01 to 0.7%, such as from 0.025 to 0.5% by dry weight of the aqueous or powder coating composition.

The aqueous or powder coating compositions according to the present invention may be substantially free of bisphenol A (BPA) and derivatives thereof. The aqueous or powder coating compositions according to the present invention may be essentially free or may be completely free of bisphenol A (BPA) and derivatives thereof. Derivatives of bisphenol A include, for example, bisphenol A diglycidyl ether (BADGE).

The aqueous or powder coating compositions according to the present invention may be substantially free of bisphenol F (BPF) and derivatives thereof. The aqueous or powder coating compositions according to the present invention may be essentially free or may be completely free of bisphenol F (BPF) and derivatives thereof. Derivatives of bisphenol F include, for example, bisphenol F diglycidyl ether (BPFG).

The aqueous or powder coating compositions according to the present invention may be substantially free of styrene. The aqueous or powder coating compositions according to the present invention may be essentially free or may be completely free of styrene.

The compounds or derivatives thereof mentioned above, i.e. BPA, BPF and derivatives thereof, may not be added to the composition intentionally but may be present in trace amounts because of unavoidable contamination from the environment. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to aqueous or powder coating compositions containing less than 20 parts per billion (ppb) of any of the compounds or derivatives thereof.

The aqueous or powder coating composition may comprise an adhesion promoter. The adhesion promoter may comprise an acidic polyester.

The acidic polyester may be added in an amount from 0.1 to 15 wt % (based on the dry weight of the aqueous or powder coatings ingredients), more suitably from 2 to 12 wt % (based on the dry weight of the aqueous or powder coatings ingredients). The acidic polyester may be present in an amount from 4 to 10 wt % (based on the dry weight of the aqueous or powder coatings ingredients).

The acidic polyester may comprise a reaction product of a polyester with a phosphorus acid, such as phosphoric acid. In this context, the polyester may have an Mn of 2000 to 10,000. The polyester may have a hydroxyl number of 20 to 75. The polyester may have an acid value of 15 to 25.

Suitably, the acidic polyester comprises a solution of a copolymer with acidic groups having an acid value from 15 up to 100 mgKOH/g. Examples of commercially available suitable acidic polyesters include are BYK-4510 (commercially available from Byk Altana) or PLUSOLIT H-PD (commercially available from Mader) or BORCHI GEN HMP-F or BORCHI GEN HE (commercially available from OMG Borchers).

Suitably, the acidic polyester may generally comprise the reaction product of:
(a) a polyester having an Mn of 2000 to 10,000, a hydroxyl number of 20 to 75, and an acid value of 15 to 25; the polyester being a polycondensate of:
 (i) a polyol component comprising a mixture of diols and triols,
 (ii) a polyacid component comprising an alpha, beta-ethylenically unsaturated polycarboxylic acid,
and
(b) a phosphorus acid.

Further suitable examples of acidic polyesters are given in WO 2012/162301, the contents of which are entirely incorporated herein by reference.

The aqueous or powder coating compositions of the present invention may comprise a further resin material. Suitable further resin materials will be well known to a person skilled in the art. Suitable examples of further resin materials include, but are not limited to the following: polyester resins; acrylic resins; polyvinyl chloride (PVC) resins; alkyd resins; polyurethane resins; polysiloxane resins; epoxy resins or combinations thereof. Suitably, the further resin material may comprise polyvinyl chloride (PVC) resins.

The aqueous or powder coating compositions of the present invention may comprise other optional materials well known in the art of formulating coatings, such as colorants, plasticizers, abrasion-resistant particles, anti-oxidants, hindered amine light stabilizers, UV light absorbers and stabilizers, surfactants, flow control agents, thixotropic agents, fillers, organic co-solvents, reactive diluents, catalysts, grind vehicles, lubricants, waxes and other customary auxiliaries. It might be particularly desired to use some quantity of non-polymerisable surfactant in conjunction with the polymerisable surfactant in the preparation of the latex and/or in a coating comprising the latex.

As used herein, the term "colorant" means any substance that imparts colour and/or other opacity and/or other visual effect to the composition. The colorant can be added to the aqueous or powder coating in any suitable form, such as discrete particles, dispersions, solutions and/or flakes. A single colorant or a mixture of two or more colorants can be used in the aqueous or powder coatings of the present invention. Suitable colorants are listed in U.S. Pat. No. 8,614,286, column 7, line 2 through column 8, line 65, which is incorporated by reference herein. Particularly suitable for packaging coatings are those approved for food contact, such as titanium dioxide; iron oxides, such as black iron oxide; aluminium paste; aluminium powder such as aluminium flake; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein.

The aqueous or powder coating compositions may comprise aluminium paste, aluminium powder, such as aluminium flake, or a combination thereof. Suitably, the aqueous or powder coating compositions may comprise aluminium paste.

The colorant, when present, may be used in the aqueous or powder coating composition in any suitable amount. The colorant, when present, may be used in the aqueous or powder coating composition in amounts up to 90 wt %, such as up to 50 wt %, or even up to 10 wt % based on the total solid weight of the aqueous or powder coating composition.

Suitable lubricants will be well known to the person skilled in the art. Suitable examples of lubricants include, but are not limited to the following: carnuba wax, PTFE, polypropylene and polyethylene type lubricants. The lubricant, when present, may be used in the aqueous or powder coating composition in amounts of at least 0.01 wt % based on the total solid weight of the aqueous or powder coating composition, suitably 0.5 to 2 wt %.

Surfactants may optionally be added to the aqueous or powder coating composition in order to aid in flow and wetting of the substrate. Suitable surfactants will be well known to the person skilled in the art. Suitably the surfactant, when present, is chosen to be compatible with food and/or beverage container applications. Suitable surfactants include, but are not limited to the following: alkyl sulphates (e.g., sodium lauryl sulphate); ether sulphates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The surfactants, when present, may be present in amounts from 0.01 wt % to 10 wt %, suitably from 0.01 to 5 wt %, such as from 0.01 to 2 wt % based on the total solid weight of the aqueous or powder coating composition.

The aqueous or powder coating compositions of the present invention may be substantially free, may be essentially free or may be completely free of dialkyltin compounds, including oxides or other derivatives thereof. Examples of dialkyltin compounds include, but are not limited to the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

A product of the present invention may be an automotive product, a household or office appliance, furniture item or tool, a powered industrial product, a consumer electronics article, an architectural product or a product protected by an intumescent coating.

An automotive product may be a vehicle or any part thereof. Any part or any surface of the vehicle which may undergo coating to improve a property thereof (for example its luster, scratch resistance, corrosion resistance or UV resistance) may be a coating with a composition as defined herein.

The term "vehicle" is used in its broadest sense and includes (without limitation) all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. Vehicles can include ground vehicles such as, for example, trailers, cars, trucks, buses, coaches, vans, ambulances, fire engines, motorhomes, caravans, go-karts, buggies, fork-lift trucks, sit-on lawnmowers, agricultural vehicles such as, for example, tractors and harvesters, construction vehicles such as, for example, diggers, bulldozers and cranes, golf carts, motorcycles, bicycles, trains, and railroad cars. Vehicles can also include watercraft such as, for example, ships, submarines, boats, jet-skis and hovercraft.

Parts of vehicles coated in accordance with the present invention may include vehicular body parts (e.g., without limitation, doors, body panels, trunk deck lids, roof panels, hoods, roofs and/or stringers, rivets, wheels, landing gear components, and/or skins used on an aircraft), hulls, marine superstructures, vehicular frames, chassis, and vehicular parts not normally visible in use, such as engine parts, motorcycle fairings and fuel tanks, fuel tank surfaces and other vehicular surfaces exposed to or potentially exposed to fuels, aerospace solvents and aerospace hydraulic fluids. Any vehicular parts which may benefit from coating as defined herein may undergo coating, whether exposed to or hidden from view in normal use.

Household and office appliances, furniture items and tools as defined herein are appliances, furniture items and tools used in the home, including the garden, or in office environments. They may include fabric washers, dishwashers, dryers, refrigerators, stoves, microwave ovens, computer equipment and printers, air conditioning units, heat pump units, lawn and garden equipment including lawn furniture, hot tubs, lawnmowers, garden tools, hedge trimmers, string trimmers (strimmers), chainsaws, garden waster shedders, garden hand tools such as, for example, spades, forks, rakes and cutting tools, cupboards, desks, table, chairs, cabinets and other articles. Any parts of any such articles which may benefit from coating as defined herein may undergo coating; for example panels of appliances or furniture and handles of tools.

A powered industrial product may include, for example, pumps, electricity generators, air compressors, industrial heat pumps and air conditioners, batteries and cement mixers. Any parts which benefit from coating as defined herein may undergo coating; for example panels and casings.

A consumer electronics article may be, for example, a computer, computer casing, television, cellphone, pager, camera, calculator, printer, scanner, digital decoder, clock, audio player, headphones or tablet.

An architectural product may be, for example, a door, window, door frame, window frame, beam or support, or a panel, walling item or roofing item used in building construction, or a solar panel.

Products protected by intumescent coatings are typically metallic structures, for example steel structures, which are coating with an intumescent coating. The metallic structures are typically load bearing parts of buildings. Unprotected steel will typically begin to soften at around 425° C. and lose approximately half of its strength by 650° C. Intumescent coatings are employed to retard the temperature increase of the steel, or other substrate. An intumescent coating may be improved by incorporation of the defined acrylic polyester resin into the matrix of the intumescent material prior to its coating onto a metallic substrate to be protected. Typically the acrylic polyester resin is present in an amount of at least 1 wt %, notably at least 2 wt %, for example at least 4 wt %, or at least 5%. Typically the acrylic polyester resin is present in an amount of up to 50 wt % by weight, notably up to 30 wt %, for example up to 25 wt %. These definitions refer to the weight of the acrylic polyester resin by weight of the admixed acrylic polyester resin/intumescent matrix material to be applied to a substrate.

Articles coated in accordance with the present invention may fall in two or more of the categories set out above. For example computer equipment may be regarded as a household or as an office item, and as a consumer electronics item. A beam or support—an architectural item—may be coated with an intumescent material.

The products of the invention do not include metal coils, or food or beverage packaging containers, aerosol cans or tubes, or components used to manufacture same In the uses defined above an aqueous or powder composition or powder composition is typically to coat surfaces and parts thereof (except for the use in an intumescent coating which is an admixture). A part may include multiple surfaces. A part may include a portion of a larger part, assembly, or apparatus. A portion of a part may be coated with an aqueous or powder composition or powder composition as defined herein or the entire part may be coated.

The substrate may be new (i.e., newly constructed or fabricated) or it may be refurbished, such as, for example, in the case of refinishing or repairing a component of an automobile or aircraft.

As mentioned above, the substrate coated by an aqueous or powder composition of the present invention may comprise a vehicle. For example, an aqueous or powder composition of the present invention may be utilized in coating a F/A-18 jet or related aircraft such as the F/A-18E Super Hornet and F/A-18F (produced by McDonnell Douglas/Boeing and Northrop); in coating the Boeing 787 Dreamliner, 737, 747, 717 passenger jet aircraft, and related aircraft (produced by Boeing Commercial Airplanes); in coating the V-22 Osprey; VH-92, S-92, and related aircraft (produced by NAVAIR and Sikorsky); in coating the G650, G600, G550, G500, G450, and related aircraft (produced by Gulfstream); and in coating the A350, A320, A330, and related aircraft (produced by Airbus). An aqueous or powder composition may be used as a coating for use in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

An aqueous or powder coating composition used in the present invention may be applied to the substrate, or a portion thereof, as a single layer or as part of a multi layer system. An aqueous or powder coating composition may be applied as a single layer. An aqueous or powder coating composition may be applied to an uncoated substrate. For the avoidance of doubt an uncoated substrate extends to a surface that is cleaned prior to application. An aqueous or powder coating composition may be applied on top of another paint layer as part of a multi layer system. For example, an aqueous or powder coating composition may be applied on top of a primer. An aqueous or powder coating composition may form an intermediate layer or a top coat layer. An aqueous or powder coating composition may be applied as the first coat of a multi coat system. Suitably, an aqueous or powder coating composition may be applied as an undercoat or a primer. The second, third, fourth etc. coats may comprise any suitable paint such as those containing, for example, epoxy resins; polyester resins; polyurethane resins; polysiloxane resins; hydrocarbon resins or combinations thereof. The second, third, fourth etc. coats may comprise polyester resins. The second, third, fourth etc. coats may be a liquid coating or a powder coating.

It will be appreciated by a person skilled in the art that an aqueous or powder coating composition may be applied before or after forming the product. For example, an aqueous or powder coating composition may be applied to substrate which is then shaped and formed into the product, or an aqueous or powder coating composition may be applied to the already formed product.

An aqueous or powder coating composition may be applied to a substrate once or multiple times.

An aqueous or powder coating composition according to the present invention may be applied to the substrate by any suitable method. Methods of applying an aqueous or powder coating composition according to the present invention will be well known to a person skilled in the art. Suitable application methods for an aqueous coating composition of the present invention include, but are not limited to the following: electrocoating; spraying; electrostatic spraying; dipping; rolling; brushing; and the like.

An aqueous or powder coating composition of the present invention may be applied to any suitable dry film thickness. An aqueous or powder coating composition of the present invention may be applied to a dry film thickness from 2 to 40 microns ($\mu$m).

Further information about suitable application methods of applying suitable coating compositions to substrates will now be given.

An aqueous composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise, for example, cold rolled steel, hot rolled steel, steel coated with zinc metal, zinc compounds, or zinc alloys, such as electrogalvanized steel, hot-dipped galvanized steel, galvanealed steel, nickel-plated steel, and steel plated with zinc alloy. The substrate may comprise an aluminum alloy. Non-limiting examples of aluminum alloys include the 1XXX, 2XXX, 3XXX, 4XXX, 5XXX, 6XXX, or 7XXX series as well as clad aluminum alloys and cast aluminum alloys, such as, for example, the A356 series. The substrate may comprise a magnesium alloy. Non-limiting examples of magnesium alloys of the AZ31B, AZ91C, AM60B, or EV31A series also may be used as the substrate. The substrate used in the present invention may also comprise other suitable non-ferrous metals such as titanium or copper, as well as alloys of these materials.

The part to be coated may be in the shape of a cylinder, such as a pipe, including, for example, a cast iron or steel pipe. The metal substrate also may be in the form of, for example, a sheet of metal or a fabricated part. The substrate may also comprise conductive or non-conductive substrates at least partially coated with a conductive coating. The conductive coating may comprise a conductive agent such as, for example, graphene, conductive carbon black, conductive polymers, or conductive additives. It will also be understood that the substrate may be pretreated with a pretreatment solution. Non-limiting examples of a pretreatment solution include a zinc phosphate pretreatment solution such as, for example, those described in U.S. Pat. Nos. 4,793,867 and 5,588,989, a zirconium containing pretreatment solution such as, for example, those described in U.S. Pat. Nos. 7,749,368 and 8,673,091. Other non-limiting examples of a pretreatment solution include those comprising trivalent chromium, hexavalent chromium, lithium salts, permanganate, rare earth metals, such as yttrium, or lanthanides, such as cerium. Another non-limiting example of a suitable surface pretreatment solution is a sol-gel, such as those comprising alkoxy-silanes, alkoxy-zirconates, and/or alkoxy-titanates. Alternatively, the substrate may be a non-pretreated substrate, such as a bare substrate, that is not pretreated by a pretreatment solution.

The substrate may optionally be subjected to other treatments prior to coating. For example, the substrate may be cleaned, cleaned and deoxidized, anodized, acid pickled, plasma treated, laser treated, or ion vapor deposition (IVD) treated. These optional treatments may be used on their own or in combination with a pretreatment solution.

An aqueous composition used in the present invention may be utilized in an electrocoating layer that is part of a multi-layer coating composite comprising a substrate with various coating layers. The coating layers may optionally include a pretreatment layer, such as a phosphate layer (e.g., zinc phosphate layer) or metal oxide layer (e.g., zirconium oxide layer), an electrocoating layer which results from an aqueous composition of the present invention, optionally primer layer(s) and suitable topcoat layer(s) (e.g., base coat, clear coat layer, pigmented monocoat, and color-plus-clear composite compositions). It is understood that suitable additional coating layers include any of those known in the art, and each independently may be waterborne, solventborne, in solid particulate form (i.e., a powder coating composition), or in the form of a powder slurry. The additional coating compositions may comprise a film-forming polymer, cross-linking material and, if a colored base coat or monocoat, a pigment. The primer layer(s) may optionally be disposed between the electrocoating layer and the topcoat layer(s). Alternatively, the topcoat layer(s) may be omitted such that the composite comprises the electrocoating layer and primer layer(s).

Moreover, the topcoat layer(s) may be applied directly onto the electrodepositable coating layer. In other words, the substrate may lack a primer layer such that the composite comprises the electrocoating layer and topcoat layer(s). For example, a basecoat layer may be applied directly onto at least a portion of the electrodepositable coating layer.

It will also be understood that any of the topcoat layers may be applied onto an underlying layer despite the fact that the underlying layer has not been fully cured. For example, a clearcoat layer may be applied onto a basecoat layer even though the basecoat layer has not been subjected to a curing step (wet-on-wet). Both layers may then be cured during a subsequent curing step thereby eliminating the need to cure the basecoat layer and the clearcoat layer separately.

"Powder" and like terms, as used herein, refers to materials that are in the form of solid particulates, as opposed to materials which are in the liquid form.

Powder coating compositions of the present invention may be applied by any suitable method. Methods of applying said powder coating compositions will be well known to a person skilled in the art. Suitable application methods include, such as electrostatic spraying, or applied by ultra corona discharge for example. Suitably, the powder coating compositions according to the present invention may be applied by ultra corona discharge.

When the substrate is electrically conductive, the powder coating composition is typically electrostatically applied. Electrostatic spray application generally involves drawing the coating composition from a fluidized bed and propelling it through a corona field. The particles of the coating composition become charged as they pass through the corona field and are attracted to and deposited upon the electrically conductive substrate, which is grounded. As the charged particles begin to build up, the substrate becomes insulated, thus limiting further particle deposition.

Powder coating compositions according to the present invention may be applied to any suitable dry film thickness. The powder coating compositions according to the present invention may be applied to a dry film thickness from 0.1 μm (microns) to 1000 μm, suitably from 3 μm to 500 μm, such as from 5 μm to 250 μm, or even from 5 μm to 150 μm, such as from 10 μm to 100 μm.

The powder component of the present invention may have an average particle size of less than 15 microns (μm). The powder component may have an average particle size of less than 12 μm, suitably, less than 10 μm, such as less than 7.5 μm, or even less than 5 μm. For the avoidance of doubt the term "less than" includes particles having the stated average particle size. For example, "less than 15 μm" refers to particles having an average particle size of 15 μm as well as those having an average particle size below this value.

Particles having these sizes may be produced by any suitable method. Suitable methods will be well known to a person skilled in the art. Examples of suitable methods include, but are not limited to, cold grinding, milling and sieving methods.

The coating compositions of the present invention may comprise a liquid carrier in which the powder component, such as acid functional polyester materials, is dispersed. For the avoidance of doubt, a dispersion is a powder suspended in a liquid. The coating compositions may comprise any suitable liquid carrier. The liquid carrier may comprise water, an organic solvent, a mixture of water and organic solvent(s) or a mixture of organic solvents. Suitably, the liquid carrier may comprise water.

According to the present invention, additional ingredients such as colorants and fillers may be present in the various coating compositions from which the top coat layers result. Any suitable colorants and fillers may be used. For example, the colorant may be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into the coatings by grinding or simple mixing. Colorants may be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

The colorant may be in the form of a dispersion including, but not limited to, a nanoparticle dispersion. Nanoparticle dispersions can include highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions may also be produced by crystallization, precipitation, gas phase condensation, and chemical attrition (i.e., partial dissolution). In order to minimize re-agglomeration of nanoparticles within the coating, a dispersion of resin-coated nanoparticles may be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

According to the present invention, special effect compositions that may be used in layer(s) of the multi-layer coating composite include pigments and/or compositions that produce appearance effects such as reflectance, pearlescence, metallic sheen, phosphorescence, fluorescence, photochromism, photosensitivity, thermochromism, mechanochromism (strain sensitive pigmentation), goniochromism and/or color-change. Additional special effect compositions may provide other perceptible properties, such as reflectivity, opacity or texture. For example, special effect compositions may produce a color shift, such that the color of the coating changes when the coating is viewed at different angles. Example color effect compositions are identified in U.S. Pat. No. 6,894,086, incorporated herein by reference. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

According to the present invention, a photosensitive composition and/or photochromic composition, which reversibly alters its color when exposed to light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition may be colorless in a non-excited state and exhibit a color in an excited state. Full color-change may appear within milliseconds to several minutes, such as from 20 seconds to 60 seconds. Example photochromic and/or photosensitive compositions include photochromic dyes.

The photosensitive composition and/or photochromic composition may be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

Primer and/or topcoat layer(s) may optionally further comprise corrosion inhibitors. The corrosion inhibitors may comprise any of the corrosion inhibitors discussed above with respect to an aqueous or powder composition, and may further comprise magnesium oxide, magnesium hydroxide, lithium salts, and/or lithium silicates According to the present invention, an aqueous or powder composition and/or layers deposited from the same, as well as any pretreatment layer, primer layer or topcoat layer, may be substantially free, essentially free, or completely free of chromium or chromium-containing compounds. As used herein, the term "chromium-containing compound" refers to materials that include trivalent chromium or hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, and strontium dichromate. When an aqueous or powder composition and/or layers deposited from the same, as well as any pretreatment layer, primer layer or topcoat layer, is substantially free, essentially free, or completely free of chromium, this includes chromium in any form, such as, but not limited to, the trivalent chromium-containing compounds and hexavalent chromium-containing compounds listed above.

An aqueous or powder composition and/or layers deposited from the same, as well as any pretreatment layer, primer layer or topcoat layer, that is substantially free of chromium or chromium-containing compounds means that chromium or chromium-containing compounds are not intentionally added, but may be present in trace amounts, such as because of impurities or unavoidable contamination from the environment. In other words, the amount of material is so small that it does not affect the properties of the composition; this may further include that chromium or chromium-containing compounds are not present in an aqueous or powder composition and/or layers deposited from the same, as well as any pretreatment layer, primer layer or topcoat layer, in such a level that they cause a burden on the environment. The term "substantially free" means that an aqueous or powder composition and/or layers deposited from the same, as well as any pretreatment layer, primer layer or topcoat layer, contain less than 10 ppm of chromium, based on total solids weight of the composition, the layer, or the layers, respectively, if any at all. The term "essentially free" means that an aqueous or powder composition and/or layers deposited from the same, as well as any pretreatment layer, primer layer or topcoat layer, contain less than 1 ppm of chromium, based on total solids weight of the composition or the layer, or layers, respectively, if any at all. The term "completely free" means that an aqueous or powder composition and/or layers comprising the same, as well as any pretreatment layer, primer layer or topcoat layer, contain less than 1 ppb of chromium, based on total solids weight of the composition, the layer, or the layers, respectively, if any at all.

According to the present invention, the coating deposited from an aqueous or powder composition describe above may be hydrolytically stable, as determined by the Hydrolytic Stability Test Method. As used herein, the "Hydrolytic Stability Test Method" refers to immersing a baked panel in deionized water at a temperature of 90° C. for 24 hours. The panel is then removed and baked in an oven set to 150° F. for 60 minutes to dehydrate the coating film. The panel is then retested for cure according to the Double Acetone Rub Test Method. Whether a coating is considered to be hydrolytically stable is demonstrated by the ability of the coating to retain acetone resistance after being subjected to the water soak compared to the acetone resistance of the coating without the water soak. Specifically, the number of double acetone rubs that the coating survived following the water soak is compared to the number of double acetone rubs the coating survived without exposure to the water soak. A coating is considered to be "hydrolytically stable" if the coating survived a number of double acetone rubs following exposure to the water soak without reaching the underlying substrate equal to at least 60% of the double acetone rubs that the coating was able to survive without exposure to the water soak, with the caveat that if the cured coating survived 100 or more double acetone rubs without exposure to the water soak, then the cured coating was considered to be hydrolytically stable if the coating survived at least 60 double acetone rubs without reaching the substrate. For example, a coating that survived 50 double acetone rubs without exposure to the water soak was considered to be hydrolytically stable if it survived at least 30 double acetone rubs following exposure to the water soak. Although reference is made to the coating prior to exposure to the water soak and after exposure to the water soak, it should be understood that two different coated panels are used with each panel having been coated by the same composition by the same technique and cured under the same conditions (i.e., same oven, oven temperature and baking time).

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" first polyester material, "a" powder overcoat aqueous or powder coating composition, "an" undercoat aqueous or powder coating composition, "an" isocyanate resin, "the" residue of "an", and the like, one or more of each of these and any other components can be used. As used herein, the term "polymer" refers to oligomers and both homopolymers and copolymers, and the prefix "poly" refers to two or more. Including, for example and like terms means including for example but not limited to. Additionally, although the present invention has been described in terms of "comprising", the processes, materials, and aqueous or powder coating compositions detailed herein may also be described as "consisting essentially of" or "consisting of".

All of the features contained herein may be combined in any combination.

For a better understanding of the invention, and to show how embodiments of the same may be carried into effect, reference will now be made, by way of example, to the following theoretical experimental data.

EXAMPLES

Acrylic Modified Polyester Resins—Examples 1-8

The details of polyester precursor examples 1 to 8 are shown in Table 1. Each of examples 1 to 8 shows the components of a polyester material. Examples 1 to 4 show unsaturated, hydroxyl functional polyesters with TMCD and 5-SSIPA. Examples 5 to 8 show unsaturated, hydroxyl functional polyesters with TMCD, but without 5-SSIPA.

The polyester materials of examples 1 to 8 are formed as follows. The 2-methyl-1,3 propanediol, polyol (TMCD), cyclohexanedimethanol, 5-SSIPA, dibutyl tin oxide, dimethyl terephthalate, hexahydrophthalic anhydride and cyclohexane 1,4-dicarboxylic acid are added as a batch to a vessel with a steam column, distillation head and condenser. The batch temperature is increased to 150 C with stirring at 400 rpm under an $N_2$ blanket. Once the temperature reaches 150 C, the batch temperature is increased to 230 C over a 4 hour period (10 C steps every 30 minutes), whilst ensuring that the head temperature is below 100 C.

Once the batch reaches 230 C, the acid value is assessed every hour. When the acid value is less than 15, the batch is cooled to 150 C and methyl hydroquinone is added, then after 10 minutes, the maleic anhydride is added and the batch temperature increased to 195 C until the acid value increases to approximately 20. The batch is then cooled to 130 C and azeotropically separated using a Dean Stark trap.

The polyester materials of examples 1 to 8 undergo a grafting process to graft acrylic onto the unsaturated functionality of the backbone of the polyester (imparted by the maleic anhydride) to form acrylic modified polyester resins 1 to 8 (noted simply as resins 1 to 8 in Table 2). Details of the monomers used in the acrylic graft reaction are shown in Table 2.

The acrylic modified polyester resins were formed as follows. The polyester material (of Examples 1 to 8) is added to a vessel with mixing at 225 rpm and heated to 120 C. Once at 120 C, the acrylate monomers are added over a period of 75 minutes with continued stirring. Then the Dowanol DPM and t-butyl peroctoate initiator is added over a period of 90 minutes and the reaction held at 120 C for a further 45 minutes. The reaction mixture is then cooled to below 80 C.

The acrylic modified polyester resins are formed into aqueous dispersions with the components as shown in Table 3.

The acrylic modified polyester resins are formed into aqueous dispersions by heating the resin to 80 to 85 C, then slowly adding deionized water to the resins (over a period of approximately 60 minutes), with the elevated temperature (80 to 85 C) maintained, then stirring the dispersed mixture for a further 60 minutes at 80 to 85 C. The aqueous dispersions are then cooled.

In forming the aqueous dispersions where the polyester material does not include a sulfonated monomer, dimethylethanol amine is added to the heated (80 to 85 C) acrylic modified polyester resin and stirred for 10 minutes until homogeneous, prior to adding the deionized water. Otherwise, the process is the same.

The aqueous dispersions are formed into aqueous coating compositions with components as shown in Table 4, as follows. The crosslinking material (Cymel 1123—benzoguanamine, commercially available from Allnex), blocked DDBSA catalyst (Nacure 5925, commercially available from King) and wax additive (Michem Lube 160, commercially available from Michelman) are stirred into the water dispersed PGA dispersion to form an aqueous coating composition suitable for use as a coating composition on an automotive product, a household or office appliance, furniture item or tool, a powered industrial product, a consumer electronics item, an architectural product, or a product protected by an intumescent coating, as described in this specification.

TABLE 1

| Material name | Ex. 1 | Ex. 2 | Ex. 3 | Ex. 4 | Ex. 5 | Ex. 6 | Ex. 7 | Ex. 8 |
|---|---|---|---|---|---|---|---|---|
| 2-Methyl-1,3 Propanediol | 339.50 | 339.50 | | | 339.50 | 339.50 | | |
| TMCD | 542.50 | 542.50 | 542.50 | 542.50 | 542.50 | 542.50 | 542.50 | 542.50 |
| Cyclohexanedimethanol | 542.50 | 542.50 | | | 542.50 | 542.50 | | |
| 5-SSIPA | 245.00 | 218.80 | 227.50 | 236.30 | | | | |
| Dibutyl Tin Oxide | 1.12 | 1.12 | 1.12 | 1.12 | 1.12 | 1.12 | 1.12 | 1.12 |
| Dimethyl Terephthalate | 385.00 | 678.10 | 332.50 | 647.50 | 564.38 | 835.63 | 503.13 | 822.50 |
| Hexahydrophthalic anhydride | 332.50 | 332.50 | 332.50 | 332.50 | | | | |
| Cyclohexane 1,4-dicarboxylic acid | | | | | 612.50 | 656.25 | 612.50 | 656.25 |
| MeHQ | 0.22 | 0.22 | 0.22 | 0.22 | 0.22 | 0.22 | 0.22 | 0.22 |
| Maleic Anhydride | 65.63 | 65.63 | 70.00 | 70.00 | 65.63 | 65.63 | 70.00 | 70.00 |
| Aromatic 100 | 269.59 | 269.59 | 269.59 | 269.59 | 269.59 | 269.59 | 269.59 | 269.59 |
| Dowanol DPM | 1312.50 | 1312.50 | 1312.50 | 1312.50 | 1312.50 | 1312.50 | 1312.50 | 1312.50 |
| Calculated Properties | | | | | | | | |
| Initial weight | 2191.47 | 2178.34 | 2372.59 | 2372.59 | 2125.84 | 2117.09 | 2315.72 | 2311.34 |
| Theoretical water loss | 211.49 | 176.59 | 211.71 | 171.72 | 244.74 | 205.79 | 243.34 | 204.16 |
| Final Resin weight | 1979.98 | 2001.75 | 2160.89 | 2200.88 | 1881.10 | 1911.31 | 2072.38 | 2107.18 |
| Total (inc solvents) | 3562.07 | 3583.84 | 3742.97 | 3782.96 | 3463.19 | 3493.39 | 3654.47 | 3689.27 |
| Approx Mn | 4877.00 | 5070.00 | 4939.00 | 5033.00 | 4753.00 | 4785.00 | 5090.00 | 5052.00 |
| OH equivalent excess | 0.81 | 0.79 | 0.88 | 0.88 | 0.79 | 0.80 | 0.81 | 0.83 |

TABLE 2

| | Resin 1 | Resin 2 | Resin 3 | Resin 4 | Resin 5 | Resin 6 | Resin 7 | Resin 8 |
|---|---|---|---|---|---|---|---|---|
| Polyester material of Ex. 1 | 453.9 | | | | | | | |
| Polyester material of Ex. 2 | | 453.9 | | | | | | |
| Polyester material of Ex. 3 | | | 453.9 | | | | | |
| Polyester material of Ex. 4 | | | | 453.9 | | | | |
| Polyester material of Ex. 5 | | | | | 453.9 | | | |
| Polyester material of Ex. 6 | | | | | | 453.9 | | |
| Polyester material of Ex. 7 | | | | | | | 453.9 | |
| Polyester material of Ex. 8 | | | | | | | | 453.9 |
| methacrylic acid | 28.8 | 28.8 | 28.8 | 28.8 | 28.8 | 28.8 | 28.8 | 28.8 |
| ethyl methacrylate | 45.6 | 45.6 | 45.6 | 45.6 | 45.6 | 45.6 | 45.6 | 45.6 |
| methyl methacrylate | 24.1 | 24.1 | 24.1 | 24.1 | 24.1 | 24.1 | 24.1 | 24.1 |
| t-butyl peroctoate | 5.9 | 5.9 | 5.9 | 5.9 | 5.9 | 5.9 | 5.9 | 5.9 |
| Dowanol DPM | 41.8 | 41.8 | 41.8 | 41.8 | 41.8 | 41.8 | 41.8 | 41.8 |
| Calculated Properties | | | | | | | | |
| final % solids | 59.00% | 59.00% | 59.00% | 59.00% | 59.00% | 59.00% | 59.00% | 59.00% |
| % polyester | 70.52% | 70.52% | 70.52% | 70.52% | 70.52% | 70.52% | 70.52% | 70.52% |
| % acrylic | 27.81% | 27.81% | 27.81% | 27.81% | 27.81% | 27.81% | 27.81% | 27.81% |
| % Initiator | 1.67% | 1.67% | 1.67% | 1.67% | 1.67% | 1.67% | 1.67% | 1.67% |

TABLE 3

| | Aq. Disp 1 | Aq. Disp 2 | Aq. Disp 3 | Aq. Disp 4 | Aq. Disp 5 | Aq. Disp 6 | Aq. Disp 7 | Aq. Disp 8 |
|---|---|---|---|---|---|---|---|---|
| Resin 1 | 300 | | | | | | | |
| Resin 2 | | 300 | | | | | | |
| Resin 3 | | | 300 | | | | | |
| Resin 4 | | | | 300 | | | | |
| Resin 5 | | | | | 300 | | | |

TABLE 3-continued

|  | Aq. Disp 1 | Aq. Disp 2 | Aq. Disp 3 | Aq. Disp 4 | Aq. Disp 5 | Aq. Disp 6 | Aq. Disp 7 | Aq. Disp 8 |
|---|---|---|---|---|---|---|---|---|
| Resin 6 |  |  |  |  |  | 300 |  |  |
| Resin 7 |  |  |  |  |  |  | 300 |  |
| Resin 8 |  |  |  |  |  |  |  | 300 |
| Dimethylethanolamine | 11.4 | 11.4 | 11.4 | 11.4 |  |  |  |  |
| Deionized Water | 290 | 290 | 290 | 290 | 278.6 | 278.6 | 278.6 | 278.6 |
| Calculated Properties |  |  |  |  |  |  |  |  |
| % solids | 59.00% | 59.00% | 59.00% | 59.00% | 59.00% | 59.00% | 59.00% | 59.00% |
| Acid Value (on 59% solids) | 30 | 30 | 30 | 30 | 30 | 30 | 30 | 30 |

TABLE 4

|  | Aq. Coating 1 | Aq. Coating 2 | Aq. Coating 3 | Aq. Coating 4 | Aq. Coating 5 | Aq. Coating 6 | Aq. Coating 7 | Aq. Coating 8 |
|---|---|---|---|---|---|---|---|---|
| Aq. Disp 1 | 79.5 wt% |  |  |  |  |  |  |  |
| Aq. Disp 2 |  | 79.5 wt% |  |  |  |  |  |  |
| Aq. Disp 3 |  |  | 79.5 wt% |  |  |  |  |  |
| Aq. Disp 4 |  |  |  | 79.5 wt% |  |  |  |  |
| Aq. Disp 5 |  |  |  |  | 79.5 wt% |  |  |  |
| Aq. Disp 6 |  |  |  |  |  | 79.5 wt% |  |  |
| Aq. Disp 7 |  |  |  |  |  |  | 79.5 wt% |  |
| Aq. Disp 8 |  |  |  |  |  |  |  | 79.5 wt% |
| Cymel 1123 (benzoguanamine) | 20.00% | 20.00% | 20.00% | 20.00% | 20.00% | 20.00% | 20.00% | 20.00% |
| Nacure 5925 (blocked DDBSA) | 0.1 wt% | 0.1 wt% | 0.1 wt% | 0.1 wt% | 0.1 wt% | 0.1 wt% | 0.1 wt% | 0.1 wt% |
| Michem Lube 160 (wax) | 0.4 wt% | 0.4 wt% | 0.4 wt% | 0.4 wt% | 0.4 wt% | 0.4 wt% | 0.4 wt% | 0.4 wt% |

Certain aspects of the invention may be combined in the following combinations.

1. A product coated on at least a portion thereof with a coating, the product being an automotive product, a household or office appliance, furniture item or tool, a powered industrial product, a consumer electronics article, an architectural product or a product protected by an intumescent coating, the coating being derived from an aqueous coating composition or a powder coating composition, the coating composition comprising:
  (a) an acrylic polyester resin, obtainable by grafting an acrylic polymer with a polyester material, the polyester material being obtainable by polymerizing:
    i) a polyacid component, with
    ii) a polyol component including a compound including 2,2,4,4-tetraalkylcyclobutane-1,3-diol
      wherein one of the polyacid component or the polyol component comprises a functional monomer operable to impart functionality on to the polyester resin, such that an acrylic polymer may be grafted with the polyester material via the use of said functionality
  (b) a crosslinking material.

2. A method of coating at least a portion of a product selected from an automotive product, a household or office appliance, furniture item or tool, a powered industrial product, a consumer electronics article, an architectural product or a product protected by an intumescent coating, the method comprising applying a coating composition to at least a portion of the surface of the product, the coating composition comprising an aqueous coating composition or a powder coating composition, the coating composition comprising an acrylic modified polyester resin and a crosslinking material, the acrylic modified polyester resin being obtainable by grafting an acrylic polymer onto a polyester material, the polyester material being obtainable by polymerizing:
  i) a polyacid component, with
  ii) a polyol component including 2,2,4,4-tetraalkylcyclobutane-1,3-diol
    wherein one of the polyacid component or the polyol component comprises a functional monomer operable to impart functionality on to the polyester resin, such that an acrylic polymer may be grafted onto the polyester material via the use of said functionality,
and curing the aqueous or powder composition to form a coating.

3. Use of a coating composition derived from an aqueous composition or a powder composition comprising an acrylic modified polyester resin and a crosslinking material, the acrylic modified polyester resin being obtainable by grafting an acrylic polymer onto a polyester material, the polyester material being obtainable by polymerizing:
  i) a polyacid component, with
  ii) a polyol component including a compound including 2,2,4,4-tetraalkylcyclobutane-1,3-diol,
    wherein one of the polyacid component or the polyol component comprises a functional monomer operable to impart functionality on to the polyester resin, such that an acrylic polymer may be grafted onto the polyester material via the use of said functionality,
to coat at least a portion of the surface of a product selected from an automotive product, a household or office appliance, furniture item or tool, a powered industrial product, a consumer electronics article, an architectural product or a product protected by an intumescent coating.

4. A product, method or use according to any preceding aspect, wherein the functional monomer comprises an ethylenically unsaturated monomer.

5. A product, method or use according to any preceding aspect, wherein the functional monomer comprise: maleic acid, maleic anhydride, fumaric acid, itaconic anhydride, itaconic acid, citraconic anhydride, citraconic acid, aconitic acid, aconitic anhydride, oxalocitraconic acid, oxalocitraconic anhydride, mesaconic acid, mesaconic anhydride, phenyl maleic acid, phenyl maleic anhydride, t-butyl maleic acid, t-butyl maleic anhydride, monomethyl fumarate, monobutyl fumarate, nadic acid, nadic anhydride, methyl maleic acid; and/or methyl maleic anhydride.

6. A product, method or use according to any preceding aspect, wherein the polyacid component comprises: dimethyl terephthalate, isophthalic acid, hexahydrophthalic anhydride; and/or cyclohexane 1,4-dicarboxylic acid.

7. A product, method or use according to any preceding aspect, wherein the 2,2,4,4-tetraalkylcyclobutane-1,3-diol comprises 2,2,4,4-tetramethylcyclobutane-1,3-diol ("TMCD").

8. A product, method or use according to any preceding aspects, wherein the polyol component comprises 2,2,4,4-tetraalkylcyclobutane-1,3-diol in combination with 2-methyl-1,3 propanediol and/or cyclohexanedimethanol.

9. A product, method or use according to any preceding aspect, wherein the polyacid component and/or the polyol component comprises a sulfonated monomer.

10. A product, method or use according to any preceding aspect, wherein the sulfonated monomer comprises: 5-(sodiosulfo)-isophthalic acid; dimethyl 5-(sodiosulfo)isophalate; 5-(lithiosulfo)isophthalic acid; and/or bis(2-hydroxyethyl)-5-(sodiosulfo)isophthalate.

11. A product, method or use according to any preceding aspect, wherein the polyester material comprises an Mn from 1,000 Daltons (Da=g/mole) to 15,000 Da.

12. A product, method or use according to any preceding aspect, wherein the acrylic polyester resin is formed from the polyester material and an acrylic modification polymer in a weight ratio from 85 wt % to 55 wt % polyester material to from 45 wt % to 15 wt % acrylic modification polymer.

13. A product, method or use according to any preceding aspect, wherein an acrylic modification polymer is polymerized in the presence of the polyester material to form an acrylic modified polyester resin.

14. A product, method or use according to any preceding aspect, wherein the acrylic modification polymer is formed from: methyl(meth)acrylate; ethyl(meth)acrylate, butyl (meth)acrylate, isobornyl (meth)acrylate, hydroxyethyl (meth)acrylate, 2-ethylhexyl(meth)acrylate, (meth)acrylic acid; cyclohexyl (meth)acrylate, allyl (meth)acrylate, dimethylamino ethyl methacrylate. butylamino ethyl (meth) acrylate, and/or HEMA phosphate (such as ethylene glycol methacrylate phosphate).

15. A product, method or use according to any preceding aspect, wherein the crosslinking material comprises a phenolic resin, benzoguanamine and/or melamine.

16. A product, method or use according to any preceding aspect, wherein the coating composition is substantially free of bisphenol A (BPA), bisphenol F (BPF) and derivatives thereof.

17. A product, method or use according to any preceding aspect, wherein the coating composition is substantially free of styrene.

18. A product, method or use according to any preceding aspect, wherein the coating composition is substantially free of formaldehyde.

19. A product, method or use according to any preceding aspect, wherein the coating composition further comprises an adhesion promoter.

20. A product, method or use according to any preceding aspect, wherein the adhesion promotor comprises an acidic polyester material.

21. A product, method or use according to aspect 20, wherein the acidic polyester generally comprises the reaction product of:
(a) a polyester having an Mn of 2000 to 10,000, a hydroxyl number of 20 to 75, and an acid value of 15 to 25; the polyester being a polycondensate of:
(i) a polyol component comprising a mixture of diols and triols,
(ii) a polyacid component comprising an alpha, beta-ethylenically unsaturated polycarboxylic acid, and
(b) a phosphorus acid.

22. A product, method or use according to any preceding aspect, wherein the polyester material has a Tg of 25 C or higher.

23. A product, method or use according to any preceding aspect, wherein acrylic polyester resin has a Tg of 25 C or higher.

24. A product, method or use according to any preceding aspect, wherein the coating formed from the coating composition has a Tg of 25 C or higher.

25. A product, method or use according to any preceding aspect, wherein the product is an automotive product which is a part of an aircraft, spacecraft, watercraft, or ground vehicle, the part being selected from vehicular doors, body panels, trunk deck lids, roof panels, hoods, roofs, stringers, rivets, wheels, landing gear components, skins used on an aircraft), hulls, marine superstructures, vehicular frames, chassis, engine parts, motorcycle fairings and fuel tanks, fuel tank surfaces and other vehicular surfaces exposed to or potentially exposed to fuels, aerospace solvents and aerospace hydraulic fluids.

26. A product, method or use according to any preceding aspect, wherein the vehicle is an airplane, a car, a truck, a bus, a tractor or a ship.

27. A product, method or use according to any preceding aspect, wherein the household or office appliance, furniture item or tool is a fabric washer, dishwasher, dryer, refrigerator, cupboard or desk.

28. A product, method or use according to any preceding aspect, wherein the powered industrial product is a pump, air compressors, heat pump or air conditioner.

29. A product, method or use according to any preceding aspect, wherein the consumer electronics article is a computer, television, cellphone, or camera.

30. A product, method or use according to any preceding aspect, wherein the architectural product is a door, window, door frame, window frame, beam or support, or a panel, walling item or roofing item used in building construction, or a solar panel.

31. A product, method or use according to any preceding aspect, wherein the product is protected by an intumescent coating, and is a metallic structure onto which the intumescent coating is applied, wherein the intumescent coating composition incorporates the acrylic polyester resin into the matrix of the intumescent material prior to its coating onto a metallic structure to be protected.

The invention claimed is:
1. A product coated on at least a portion thereof with a coating, the product being a vehicle product, a household or office appliance, furniture item or tool, a powered industrial product, a consumer electronics article, an architectural product or a product protected by an intumescent coating, the coating being derived from an aqueous coating composition or a powder coating composition, the coating composition comprising:
  (a) an acrylic polyester resin, obtained by grafting an acrylic polymer with a polyester material, the polyester material being obtained by polymerizing:
    i) a polyacid component, with
    ii) a polyol component including a compound including a 2,2,4,4-tetraalkylcyclobutane-1,3-diol
    wherein one of the polyacid component or the polyol component comprises a functional monomer operable to impart functionality on to the polyester resin, such that an acrylic polymer is grafted with the polyester material via the use of said functionality,
  (b) a crosslinking material,
  wherein the polyester material has a glass transition temperature (Tg) of at least 50° C., and wherein the polyester material does not include a sulfonated monomer.

2. A method of coating at least a portion of a product selected from an automotive product, a household or office appliance, furniture item or tool, a powered industrial product, a consumer electronics article, an architectural product or a product protected by an intumescent coating, the method comprising applying a coating composition to at least a portion of the surface of the product, the coating composition comprising an aqueous coating composition or a powder coating composition, the coating composition comprising an acrylic modified polyester resin and a crosslinking material, the acrylic modified polyester resin being obtained by grafting an acrylic polymer onto a polyester material, the polyester material being obtained by polymerizing:
  i) a polyacid component, with
  ii) a polyol component including a a 2,2,4,4-tetraalkylcyclobutane-1,3-diol
  wherein one of the polyacid component or the polyol component comprises a functional monomer operable to impart functionality on to the polyester resin, such that an acrylic polymer is grafted onto the polyester material via the use of said functionality,
  and curing the aqueous or powder composition to form a coating,
  wherein the polyester material has a glass transition temperature (Tg) of at least 50° C., and wherein the polyester material does not include a sulfonated monomer.

3. The product according to claim 1, wherein the functional monomer comprises an ethylenically unsaturated monomer.

4. The product according to claim 3, wherein the functional monomer comprises: maleic acid, maleic anhydride, fumaric acid, itaconic anhydride, itaconic acid, citraconic anhydride, citraconic acid, aconitic acid, aconitic anhydride, oxalocitraconic acid, oxalocitraconic anhydride, mesaconic acid, mesaconic anhydride, phenyl maleic acid, phenyl maleic anhydride, t-butyl maleic acid, t-butyl maleic anhydride, monomethyl fumarate, monobutyl fumarate, nadic acid, nadic anhydride, methyl maleic acid; and/or methyl maleic anhydride.

5. The product according to claim 1, wherein the polyacid component comprises: dimethyl terephthalate, isophthalic acid, hexahydrophthalic anhydride; and/or cyclohexane 1,4-dicarboxylic acid.

6. The product according to claim 1, wherein the 2,2,4,4-tetraalkylcyclobutane-1,3-diol comprises 2,2,4,4-tetramethylcyclobutane-1,3-diol ("TMCD").

7. The product according to claim 1, wherein the polyol component comprises 2,2,4,4-tetraalkylcyclobutane-1,3-diol in combination with 2-methyl-1,3 propanediol and/or cyclohexanedimethanol.

8. The product according to claim 1, wherein the polyester material comprises a Mn from 1,000 Daltons (Da=g/mole) to 15,000 Da.

9. The product according to claim 1, wherein the acrylic polyester resin is formed from the polyester material and an acrylic modification polymer in a weight ratio from 85 wt % to 55 wt % polyester material to from 45 wt % to 15 wt % acrylic modification polymer.

10. The product according to claim 1, wherein an acrylic modification polymer is polymerized in the presence of the polyester material to form an acrylic modified polyester resin.

11. The product according to claim 10, wherein the acrylic modification polymer is formed from: methyl(meth)acrylate, ethyl(meth)acrylate, butyl (meth)acrylate, isobornyl (meth)acrylate, hydroxyethyl (meth)acrylate, 2-ethylhexyl (meth)acrylate, (meth)acrylic acid; cyclohexyl (meth)acrylate, allyl (meth)acrylate, dimethylamino ethyl methacrylate, butylamino ethyl (meth)acrylate; and/or HEMA phosphate.

12. The product according to claim 1, wherein the crosslinking material comprises a phenolic resin; benzoguanamine; and/or melamine.

13. The product according to claim 1 wherein the coating composition is substantially free of bisphenol A (BPA), bisphenol F (BPF) and derivatives thereof.

14. The product according to claim 1, wherein the coating composition is substantially free of styrene.

15. The product according to claim 1, wherein the coating composition is substantially free of formaldehyde.

16. The product according to claim 1, wherein the coating composition further comprises an adhesion promoter.

17. The product according to claim 16, wherein the adhesion promotor comprises an acidic polyester material.

18. The product according to claim 17 wherein the acidic polyester generally comprises the reaction product of:
  (a) a polyester having an Mn of 2000 to 10,000, a hydroxyl number of 20 to 75, and an acid value of 15 to 25; the polyester being a polycondensate of:
    (i) a polyol component comprising a mixture of diols and triols,
    (ii) a polyacid component comprising an alpha, beta-ethylenically unsaturated polycarboxylic acid, and
  (b) a phosphorus acid.

19. The product according to claim 1, wherein the product is a vehicle product which is a part of an aircraft, spacecraft, watercraft, or ground vehicle, the part being selected from doors, body panels, trunk deck lids, roof panels, hoods, roofs, stringers, rivets, wheels, landing gear components, skins used on an aircraft, hulls, marine superstructures, vehicular frames, chassis, engine parts, motorcycle fairings and fuel tanks, fuel tank surfaces and other vehicular surfaces exposed to or potentially exposed to fuels, aerospace solvents and aerospace hydraulic fluids.

20. The product according to claim 1, wherein the vehicle is an airplane, a car, a truck, a bus, a tractor or a ship.

21. The product according to claim 1, wherein the household or office appliance, furniture item or tool is a clothes washer, dishwasher, dryer, refrigerator, cupboard or desk.

22. The product according to claim 1, wherein the powered industrial product is a pump, air compressors, heat pump or air conditioner.

23. The product according to claim 1, wherein the consumer electronics article is a computer, television, cellphone, or camera.

24. The product according to claim 1, wherein the architectural product is a door, window, door frame, window frame, beam or support, or a panel, walling item or roofing item used in building construction, or a solar panel.

25. The product according to claim 1, wherein the product is protected by an intumescent coating, and is a metallic structure onto which the intumescent coating is applied, wherein the intumescent coating composition incorporates the acrylic polyester resin into the matrix of the intumescent material prior to its coating onto a metallic structure to be protected.

* * * * *